(12) United States Patent (10) Patent No.: US 8,656,509 B2
Watanabe et al. (45) Date of Patent: Feb. 18, 2014

(54) SCANNING PROBE MICROSCOPE AND SURFACE SHAPE MEASURING METHOD USING SAME

(75) Inventors: Masahiro Watanabe, Yokohama (JP); Toshihiko Nakata, Hiratsuka (JP); Takehiro Tachizaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/704,051

(22) PCT Filed: May 20, 2011

(86) PCT No.: PCT/JP2011/061680
§ 371 (c)(1),
(2), (4) Date: Apr. 5, 2013

(87) PCT Pub. No.: WO2012/035826
PCT Pub. Date: Mar. 22, 2012

(65) Prior Publication Data
US 2013/0212749 A1 Aug. 15, 2013

(30) Foreign Application Priority Data
Sep. 14, 2010 (JP) ................... 2010-205611

(51) Int. Cl.
*G21K 7/00* (2006.01)
(52) U.S. Cl.
CPC ....................................... *G21K 7/00* (2013.01)
USPC ..................................... 850/3; 850/1; 73/105
(58) Field of Classification Search
USPC ........................................ 850/3, 1; 73/105
See application file for complete search history.

(56) References Cited

U.S. PATENT DOCUMENTS

| 7,498,589 B2 * | 3/2009 | Maruyama et al. ...... 250/442.11 |
| 8,353,060 B2 * | 1/2013 | Watanabe et al. .............. 850/26 |
| 2004/0245600 A1 | 12/2004 | Kamiya |

FOREIGN PATENT DOCUMENTS

| JP | 6-258070 A | 9/1994 |
| JP | 2004-125540 A | 4/2004 |
| JP | 3544453 B2 | 7/2004 |
| JP | 2004-303991 A | 10/2004 |
| JP | 2005-347484 A | 12/2005 |
| JP | 2006-118867 A | 5/2006 |
| JP | 2007-41406 A | 2/2007 |
| JP | 2008-76221 A | 4/2008 |

OTHER PUBLICATIONS

Corresponding International Search Report with English Translation dated Jul. 5, 2011 (four (4) pages).

* cited by examiner

*Primary Examiner* — Kiet T Nguyen
(74) *Attorney, Agent, or Firm* — Crowell & Moring LLP

(57) ABSTRACT

It has been difficult to highly accurately measure the profiles of samples using scanning probe microscopes at the time when scanning is performed due to scanning mechanism fluctuations in the non drive direction, i.e., vertical direction. The present invention is provided with, on the rear side of a sample stage, a high-accuracy displacement gauge for measuring fluctuation in the non drive direction, i.e., vertical direction, at the time when the sample stage is being scanned in the horizontal directions, and as a result, highly accurate planarity evaluation with accuracy of sample nm-order or less is made possible by correcting sample surface shape measurement results obtained using a probe.

7 Claims, 23 Drawing Sheets

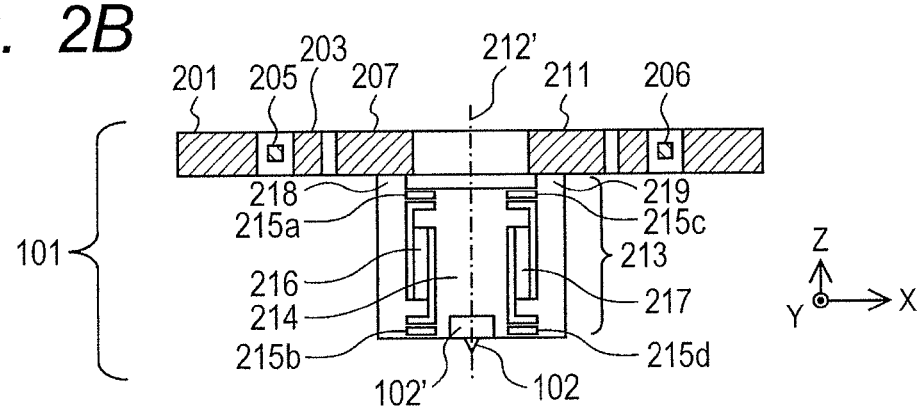
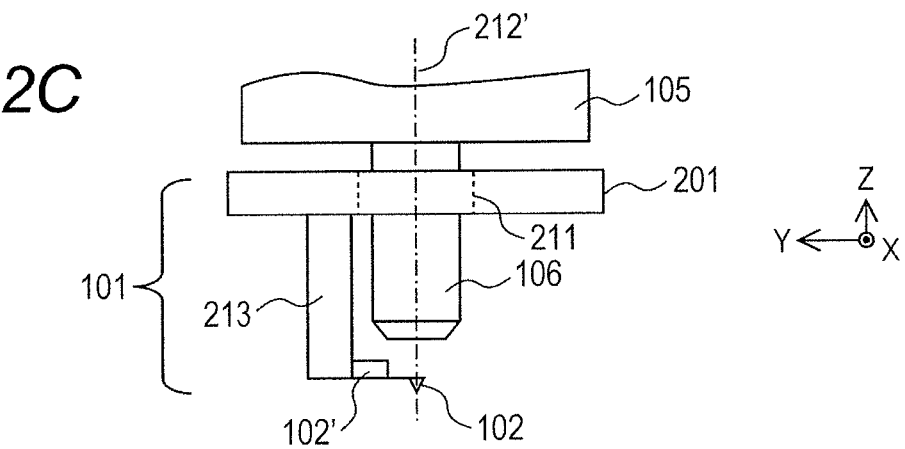
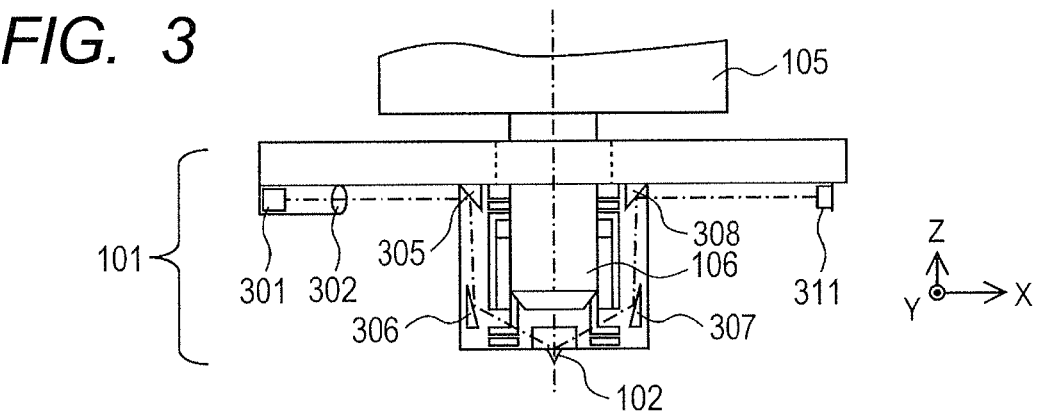

SYNTHETIC CAPACITY        $Cp/(1+\alpha)$
SYNTHETIC TIME CONSTANT   $Rp \cdot Cp/(1+\alpha)$
ON CONDITION THAT         $Rb \gg Rp$ $$Z = \frac{Z1 \ast x2 + Z2 \ast x1}{x2 + x1}$$

$$Z' = \frac{Z \ast y2 + Z3 \ast y1}{y2 + y1}$$

FIG. 24
(a) ACTUAL PROFILE
451
(b) VERTICAL MOVEMENT OF STAGE
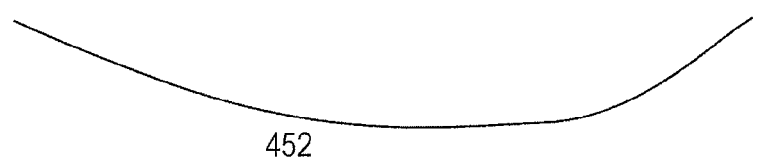
452
(c) MEASURED PROFILE
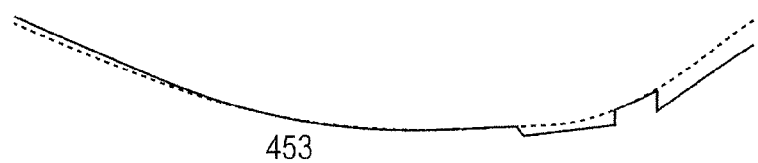
453
(d) CORRECTED PROFILE = MEASURED PROFILE - VERTICAL MOVEMENT OF STAGE
454
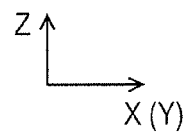

SCANNING PROBE MICROSCOPE AND SURFACE SHAPE MEASURING METHOD USING SAME

TECHNICAL FIELD

The present invention relates to a scanning probe microscope for high-accuracy measurement of a sample shape, and a surface shape measuring method of the sample using the same.

BACKGROUND

With the miniaturizing trend of circuit patterns in progress associated with high integration of the semiconductor circuit, inspection measurement technique and failure analysis technique for the semiconductor manufacturing process has been increasingly recognized as important. Increase in the recording density of the hard disk device has placed more importance on the miniature structure or planarity of the pole part of the record/reproduction head, surface roughness of the recording medium, and measurement of a three-dimensional shape of stripe-like or dot-like structure of magnetism for further improving the recording density. The scanning probe microscope (hereinafter referred to as SPM: Scanning Probe Microscope) optimal for such usage has been widely known as an approach to measurement of the shape of the sample surface in the atomic order by scanning with the probe while having a fine probe tip brought proximal to or in contact with the sample surface.

Under the surface shape measurement using the SPM, the inspection region is restricted to a narrow region, for example, within several hundreds of micrometers square or less. Meanwhile, when measuring the very small area in the atomic order, the field of view ranging from several tens to several hundreds of nanometers is required to be measured with the accuracy in the atomic order or less. In this case, the mechanism for scanning with the probe is required to exhibit high positioning accuracy. Meanwhile, the broad range of approximately several tens of micrometers is required to be observed at high speeds in order to identify the measurement region. Furthermore, the local difference in height of the sample surface in the broad range of several hundreds of micrometers needs to be measured at high speeds.

Use of the SPM provides an advantage to ensure measurement of the three-dimensional shape of the sample surface with high resolution of approximately 0.1 nanometers. However, a certain amount of time is required to position the measurement point, and to measure at the point on the sample surface, thus failing to provide sufficient measurement throughput. In the manufacturing line for the device such as the semiconductor and the hard disk device, it is not used in-line (in the manufacturing process), and accordingly, it is mainly used off-line for the failure analysis. If measurement results of the SPM allow immediate detection of abnormality of the respective process devices, and feedback to the processing conditions of the respective process devices, manufacturing of the failure products may be minimized to improve the production yield on the manufacturing line. Therefore, implementation of the in-line SPM is highly expected. Upon implementation of the in-line SPM, it is essential to perform the processing (measurement) of the measurement points as large as possible for a unit time. The manufacturing line at present requires the processing time of 20 seconds or shorter, which may be converted into the measurement throughput corresponding to 30 WPH (wafer per hour) or more.

Generally, a piezoelectric device is used as an actuator of a mechanism for positioning the probe of the SPM on the sample with high-accuracy. For example, Patent Literature 1 discloses that the highly accurate SPM is realized by three axes X, Y and Z as parallel flat plates, which are individually driven by piezoelectric devices, and simultaneously, the probe position is controlled through measurement by means of a displacement gauge. A three-dimensional miniature scan mechanism as disclosed in Patent Literature 2 serves as another probe drive mechanism for improving positioning accuracy of the probe. This mechanism is configured to use three voice coil motors for driving three-axis stage provided with a Y-stage connected to an outer frame with an elastic member, and an XZ-stage (serving as both X-stage and Z-stage) connected to the Y-stage therein with the elastic member.

All the stages each consisted of the same member are integrally formed. The driving force of the voice coil motor is applied to each of those stages via a spindle. The respective spindles are configured to be always pressed in the operation direction of each of the stages in parallel regardless of displacement of the respective stages. For example, when only the Y-stage is operated, the elastic members for connecting the outer frame and the Y-stage are all elastically deformed uniformly. Therefore, there is no chance of application of the unnecessary force to the operation axis other than the Y-axis. This makes it possible to realize the probe scanning mechanism capable of controlling the probe positioning with respect to the three axes of the probe individually with high-accuracy. Patent Document 3 discloses the method of improving the stage positioning resolution using the piezoelectric device that is formed by connecting two types of those for fine and rough movements.

Patent Literature 4 discloses the SPM configured to improve the measurement throughput. Specifically, the sample surface position is detected by an approach sensor formed of an objective lens placed just above the probe, a laser diode, and a photodiode. The sample surface is brought into proximal to the tip position of the probe at high speeds to shorten the time taken for the SPM to start the measuring operation so as to improve the measurement throughput of the SPM. The SPM as disclosed in Patent Literature 3 has the objective lens just above the probe contact position on the sample. As the objective lens is placed just above the probe contact position on the sample, the measurement positioning on the sample is performed using an observation optical system, and then the measurement may be performed without moving the sample position. This makes it possible to improve the SPM measurement throughput.

CITATION LIST

Patent Literature

Patent Literature 1: Japanese Patent Laid-Open Publication No. 2004-303991
Patent Literature 2: Japanese Patent No. 3544453
Patent Literature 3: Japanese Patent Laid-Open Publication No. 2005-347484
Patent Literature 4: Japanese Patent Laid-Open Publication No, 2004-125540

SUMMARY OF INVENTION

Technical Problem

Since the generally employed SPM has an unintentional displacement in Z-direction as the probe scanning mechanism of the probe scans in the XY-direction, planarity in the nm-order cannot be expected. There has been an example of measuring displacement of a probe attachment portion of the high-accuracy probe scanning mechanism. In this case, however, it is difficult to implement both the high-accuracy probe scanning mechanism and the scanning over the broad range. Although the scanning mechanism that covers the broad range is operated for scanning in the XY-direction at the sample side instead of the probe side, and for driving in the Z-direction at the probe side, the vertical movement in the Z-direction occurs in association with the scanning in the XY-direction on the sample stage. In the aforementioned case, the planarity in the nm-order cannot be expected.

It is an object of the present invention to provide a scanning probe microscope capable of scanning with the probe in the broad range quickly and scanning with the probe in the small range accurately with high resolution by solving the aforementioned problem of the related art, and a sample surface shape measuring method using the scanning probe microscope.

Solution to Problem

In order to address the aforementioned problem, the present invention is configured to allow the high-accuracy displacement system to measure the displacement in the Z-direction as the non drive direction of the XY-stage at the sample side, and to correct the measurement value of the scanning probe microscope based on the measured value, or execute feedback to the probe displacement mechanism so as to ensure high-accuracy profile measurement under no influence of fluctuation of the position of the XY-stage in the non drive direction during the sample scanning.

For the purpose of addressing the problem, the present invention provides a scanning probe microscope which measures a surface shape of a sample by bringing a probe into proximal to or contact with the surface of the sample, comprising: a probe, a probe holder that holds the probe, probe drive unit that drives the probe holder at least in a vertical direction, first measurement unit which measures a position of the probe drive unit in the vertical direction, sample stage unit movable in a plane, on which the sample is mounted, second measurement unit which measures a position of the sample stage unit in a direction orthogonal to the plane, vertical rough stage unit configured to change a vertical relative position between the probe held by the probe holder and the sample stage unit, horizontal rough stage unit configured to change a horizontal relative position between the probe held by the probe holder and the sample stage unit, detection unit which detects a contact state between the sample and the probe held by the probe holder, and image generation unit that generates an image of the sample surface using information obtained through measurement performed by the first measurement unit, information obtained through measurement performed by the second measurement unit, and information obtained through detection performed by the detection unit.

For the purpose of attaining the problem, the present invention provides a sample surface shape measuring method using a scanning probe microscope, which includes the steps of driving a probe in a vertical direction with respect to a surface of a sample mounted on a sample stage that is movable in a plane using a probe drive system, bringing the probe into proximal to or contact with the surface of the sample by changing a relative position between the probe and the sample stage in the vertical direction using vertical rough stage unit, measuring a position of the probe drive system in the vertical direction, measuring a position of the sample stage in a direction orthogonal to the plane, and correcting a displacement component of the sample stage in the direction orthogonal to the plane upon movement of the sample stage therein using information derived from measurement of the position of the probe drive system in the vertical direction, and information derived from measurement of the position of the sample stage in the direction orthogonal to the plane for measurement of the surface shape of the sample.

Advantageous Effects of Invention

The present invention allows the high-accuracy profile measurement under no influence of fluctuation in the position in the non drive direction of the XY-stage during the sample scanning.

Application of the SPM according to the invention to the manufacturing process of the semiconductor and hard disk ensures optimization of conditions for processing the manufacturing apparatus based on the measurement results of the SPM, thus improving yield of the device manufacturing process.

BRIEF DESCRIPTION OF DRAWINGS

FIG. 2B is a sectional view schematically showing a front part of the probe drive unit of the scanning probe microscope.

FIG. 2C is a side view schematically showing a structure of the probe drive unit of the scanning probe microscope.

FIG. 3 is a front view schematically showing a structure of a probe deflection detection optical system.

FIG. 24 is a view showing an actual profile, a profile under stage vertical movement, a measured profile, and a corrected profile of the sample surface, respectively.

DESCRIPTION OF EMBODIMENTS

Figure 1:
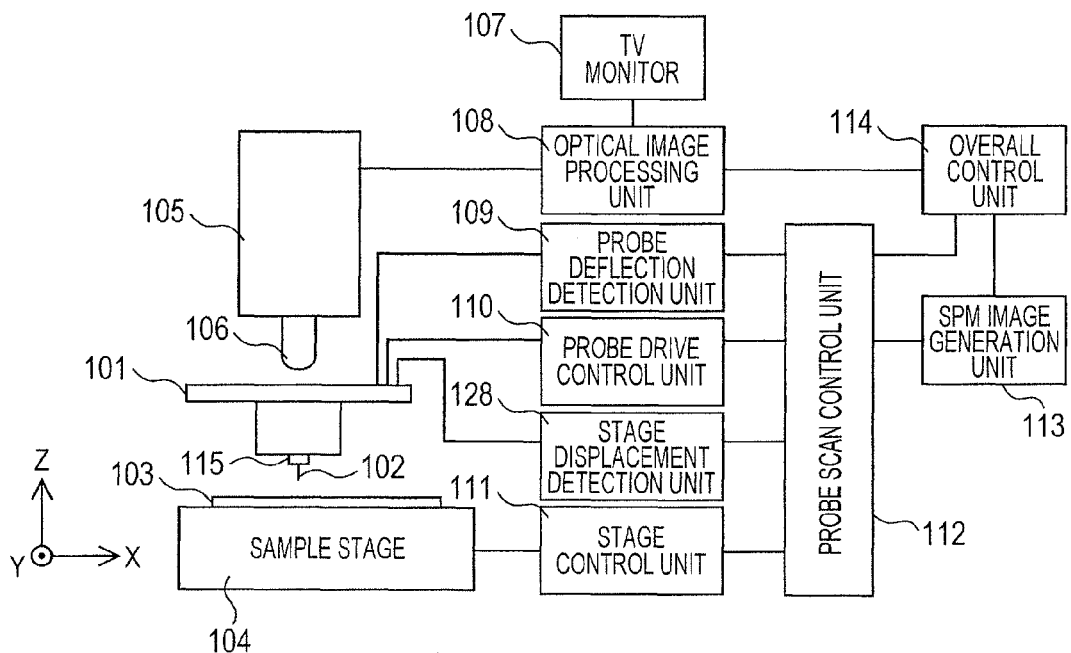
FIG. 1 is a block diagram of an overall structure of a scanning probe microscope.

As a first embodiment of the present invention, a structure of the SPM as a base of the invention will be described referring to FIGS. 1 to 3. Referring to FIG. 1, a reference numeral 103 denotes a measuring sample, 104 denotes a sample stage which holds the sample 103 through vacuum suction so as to be moved in X-, Y-, and Z-directions, and a rotating direction in an XY-plane. Operations of the sample stage are controlled by a stage control unit 111. A probe 102 is held by a probe drive mechanism 101 via a probe holder 115.

The probe drive mechanism 101 accurately positions the probe 102 above the sample 103 in the X-, Y- and Z-directions. The probe 102 is formed of a silicon material, and has a tip processed through etching or focused ion beams to have a diameter of 10 nanometers or less. Alternatively, it may have the tip provided with a carbon nanotube with the diameter of approximately 10 nm. The probe 102 includes a cantilever and the probe formed on the distal end thereof. In the specification, the cantilever and the probe altogether will be simply referred to as the probe. An observation optical system lens barrel 105 provided with an objective lens 106 is placed above the probe drive mechanism 101.

The observation optical system 105 has a built-in image pickup camera. An optical image of a surface of the sample 103 that has been magnified by the objective lens 106 is displayed on a TV camera (TV monitor) 107 via an optical image processing unit 108. Each of the observation optical system 105 and the objective lens 106 has a focus axis that is vertically moved in Z-direction by a moving mechanism (not shown). A small piezoelectric device may be combined with the probe holder 115 so as to ensure oscillation of the retained probe 102 at the amplitude in the order ranging from several to several tens of nanometers.

Figure 2A:
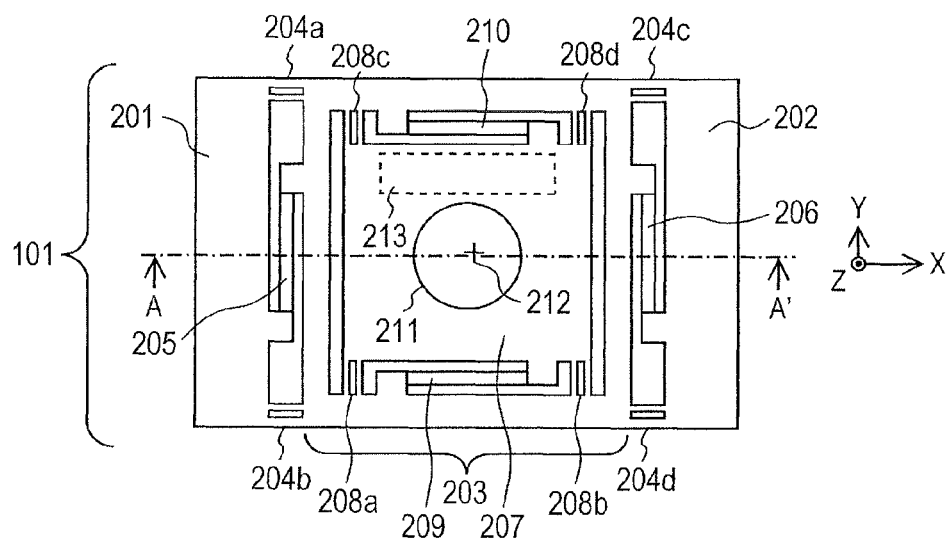
FIG. 2A is a plan view showing a schematic structure of a probe drive unit of the scanning probe microscope.

FIGS. 2A to 2C are explanatory views showing a structure of the probe drive mechanism 101 shown in FIG. 1. FIG. 2A is an XY-plan view of the probe drive mechanism 101, FIG. 2B is a sectional view of the probe drive mechanism 101 taken along line A-A', and FIG. 2C is a YZ-plan view of the probe drive mechanism 101. The probe drive mechanism 101 is formed by integrating holders 201 and 202, and a Y-stage 203 in the same plane via elastic deformation portions 204a, 204b, 204c, 204d, and further integrating an X-stage 207 in the same plane as the Y-stage 203 via elastic deformation portions 208a, 208b, 208c, 208d so that the X-stage 207 is orthogonal to the Y-stage 203. The X-stage 207 has a through hole 211 through which the objective lens 106 penetrates. Multilayer piezoelectric devices (in this embodiment, it will be simply referred to as a piezoelectric device) 205, 206 are bonded between the holders 201, 202 and the Y-stage 203. As the piezoelectric devices 205 and 206 equally expand/contract at the same time, the Y-stage 203 is driven in the Y-axis direction. A drive mechanism formed of the piezoelectric device 205 and the elastic deformation portions 204a, 204b, and another drive mechanism formed of the piezoelectric device 206 and the elastic deformation portions 204c, 204d, which are paired are symmetrically arranged with respect to a field of view center position 212 of the objective lens (tip position of the probe 102) as the center.

A general piezoelectric device (piezo-ceramic element) has its length varied by application of direct current voltage. In order to obtain a large displacement at low voltage, the multilayer piezoelectric device with stack of a thin piezoelectric device and the electrode has been often used. For example, the multilayer piezoelectric device with its length of 40 mm will extend by 20 micrometers by applying the voltage of 100V. In this case of the piezoelectric device, assuming that the voltage noise is approximately 5 mV, the resolution is obtained by multiplying the movable distance by a ratio between the noise and the maximum applied voltage, that is, 1 nanometer. The structure that establishes the resolution in the order of subnanometer will be described later.

Piezoelectric devices 209 and 210 are bonded between the Y-stage 203 and the X-stage 207. The X-stage 207 is driven in X-axis direction by equal expansion/contraction of the piezoelectric devices 209 and 210 at the same time. The drive mechanism formed of the piezoelectric device 209 and the elastic deformation portions 208a, 208b, and the drive mechanism formed of the piezoelectric device 210 and the elastic deformation portions 208c, 208d, which are paired are symmetrically arranged with respect to the field of view center position 212 of the objective lens (tip position of the probe 102) as the center. Each of the piezoelectric devices 209 and 210 has its maximum movable distance set to 20 micrometers, and movable resolution set to 1 nanometer.

A Z-axis mechanism 213 is attached to a bottom surface of the X-stage 207 orthogonal to the movable plane of the Y-stage 203 and the X-stage 207. The Z-axis mechanism 213 is configured by integrating fixed portions 218, 219 with a Z-stage 214 in the same plane via elastic deformation portions 215a, 215b, 215c, and 215d. Piezoelectric devices 216 and 217 are bonded between the fixed portions 218, 219 and the Z-stage 214. The Z-stage 214 is driven in the Z-axis direction by equal amount of expansion/contraction of the piezoelectric devices 216 and 217 at the same time. A drive mechanism formed of the piezoelectric device 216 and the elastic deformation portions 215a, 215b, and another drive mechanism formed of the piezoelectric device 217 and the elastic deformation portions 215c, 215d, which are paired are symmetrically arranged with respect to an optical axis 212' of the objective lens in an XZ-plane. Each of the piezoelectric devices 216 and 217 has the maximum variable distance set to 10 micrometers, and the movable resolution set to 1 nanometer. The probe 102 is attached to the Z-stage 214 via the probe holder 115 so that the tip position of the probe 102 is aligned with the field of view center position 212 of the objective lens.

As described above, the probe drive mechanism 101 according to the present invention allows the X-stage 207, Y-stage 203, and Z-stage 214 for driving the probe 102 three-dimensionally to be independently operated without being interfered with one another. At left and right sides of the Y-stage 203, for example, the stage drive mechanism formed of the two elastic deformation portions 204a, 204b arranged on an extended line of an expanding/contracting axis of the interposed piezoelectric device 205, and another stage drive mechanism (piezoelectric device 206, elastic deformation portions 204c, 204d), which are paired are arranged. As each of the piezoelectric devices 205 and 206 expands and contracts by equal amount, the elastic deformation portions 204a, 204b, 204c and 204d may be uniformly deformed. This may eliminate Abbe error of the Y-stage 203, resulting in improved straightness of the Y-stage 203 far better than ever before. It is clear that the principle of the operation applies to the X-stage 207 and the Z-stage 214. Operations of the X-stage 207, Y-stage 203 and Z-stage 214 of the probe drive mechanism 101 are controlled by a probe drive control unit 110.

The multilayer piezoelectric devices may individually cause difference in the expanding/contracting displacement upon application of the voltage. Hysteresis characteristics exist between the applied potential and the displacement irrespective of use of the same piezoelectric device. In this case, the hysteresis characteristic which differs for the individual piezoelectric device is preliminarily measured so that the applied voltage is adjusted for the respective piezoelectric devices to establish the desired displacement. In the embodiment, the piezoelectric devices are used for operating the X-stage 207, Y-stage 203, and Z-stage 214 of the probe drive mechanism 101. However, the power source for the respective stages is not limited to the piezoelectric device, but may be a linear actuator so long as it provides accuracy and power sufficient to have positioning of the probe 102. As the material for forming the probe drive mechanism 101, the material with a large ratio between rigidity and specific gravity such as aluminum alloy and titanium, and the material with low thermal expansion coefficient (linear expansion coefficient) such as a nickel-iron alloy may be used.

The observation optical system lens barrel 105 and the objective lens 106 provided above the probe drive mechanism 101 are allowed to be vertically moved in the Z-axis direction by a moving mechanism (not shown). They are inserted into the through hole 211 formed in the X-stage 207 so as not to bring the objective lens 106 into contact with the probe drive mechanism 101. As the probe drive mechanism 101 according to the present invention has no mechanism above the probe 102 for scanning, the objective lens 106 allows direct observation of the probe 102, and at the same time, observation of the surface of the sample 103 with high resolution. For example, if the aperture ratio of the objective lens 106 is specified to 0.7, and the operation distance is specified to 6 mm, the pattern on the sample 103 may be clearly observed in the condition where the resolution is 1 micrometer or less. As the objective lens 106 and the sample stage 104 are moved downward by equal amount (for example, by 1 mm) so that the objective lens 106 is not brought into contact with the probe 102 while having its position fixed, the pattern on the sample 103 just below the probe 102 can be observed without being influenced by the presence of the probe 102 placed within the field of view of the objective lens 106. The aforementioned process may be realized using the optical phenomenon that occurs under the condition where the objective lens 106 has high aperture ratio, and the probe 102 occupies only a part of the field of view of the objective lens 106.

FIG. 3 is an explanatory view with respect to the XZ-plane of the probe drive mechanism 101, showing a structure of the probe deflection detection unit for detecting contact between the probe 102 and the surface of the sample 103. A reference numeral 301 denotes a laser diode with oscillation wavelength set to 600 nanometers, and oscillation output set to 0.1 milliwatts. The laser light oscillated from the laser diode 301 is shaped by a collimator lens 302 into parallel light, and is turned back on a mirror 303 (not shown) attached to the holder 202 in the Y-axis direction. It is further reflected on a mirror 304 (not shown) attached to the Y-stage 203 in the X-axis direction again, and is applied to the back surface of the probe 102 via mirrors 305 and 306. The laser light reflected on the back surface of the probe 102 is reflected by mirrors 307 and 308, and is turned back on a mirror 309 (not shown) attached to the Y-stage 203 in the Y-axis direction. It is further reflected in the X-axis direction again by a mirror 310 (not shown) attached to the holder 202 so as to be received by a photodetector 311. The laser diode 301 is fixed to the holder 201 of the probe drive mechanism 101, the photodetector 311 is fixed onto the holder 202, and the mirrors 305, 306, 307 and 308 are fixed to the Z-stage 214 using a jig (not shown) so as to allow detection of deflection amount of the probe as the change in the laser irradiation position of the photodetector 311 on the laser beam receiving surface irrespective of position of the probe 102.

As the photodetector 311, a PSD (position sensitive device), an image sensor, a bisecting or quad-cell photodiode may be employed. When deflection is generated in the probe 102 as a result of contact between the probe 102 and the sample 103, the laser irradiation position on the light receiving surface of the photodetector 311 will move in the Y-axis direction. The photodetector 311 converts the change in the laser irradiation position into a voltage signal, and allows a probe deflection detection unit 109 to detect the contact between the probe 102 and the surface of the sample 103. The probe deflection detection unit may be configured to detect amplitude and phase of the oscillation of a probe deflection signal, which is caused by deflection of the probe 102 when it is oscillated by the probe holder 115 and the like so as to detect the force acting between the probe 102 and the sample 103. In other words, when the tip of the oscillating probe is brought into closer to the sample, the force acting between the probe tip and the sample changes oscillation states, for example, the oscillation amplitude, phase of the oscillation with respect to the oscillation signal, and the oscillation frequency. The force may be measured by detecting those oscillation states.

The structure of the high speed SPM that covers broad range with high-accuracy, which is provided with the rough movement mechanism, a responsive switching mechanism, and a displacement gauge will be described referring to FIGS. 4A and 4B.

Measurement of the probe position in the Z-direction will be described. The probe holder 115 is configured to have its part opposite a Z-axis capacitive sensor 224 fixed to the bottom surface of at least any one of holders 201' and 202', or the bottom surface of an X-stage 207' with a mechanism (not shown). The interval between opposite surfaces of the probe holder 115 and the capacitive sensor 224 is set to 20 micrometers. The Z-axis capacitive sensor 224 is capable of measuring the distance from the probe holder 115 with the resolution of 0.1 nanometers, so as to measure the moving distance of a Z-stage 214'. The probe holder 115 and the Z-axis capacitive sensor 224 are provided on the Z-axis overlapped with the optical axis 212' of the objective lens in the XZ-plane.

This arrangement allows measurement of the stage displacement (displacement of the tip position of the probe 102) at the field of view center position 212 of the objective lens. This structure hardly causes the Abbe error in spite of yawing error in the operation of the Z-stage 214'. The probe holder 115 is formed of the metal material having electrical conduction with the metal material for forming the Z-stage 214', and has the surface opposite the Z-axis capacitive sensor 224 subjected to the precision grinding process. Use of the displacement sensor with higher accuracy, for example, the laser interference displacement gauge to be described later with the resolution of approximately 10 picometers in place of the capacitive sensor ensures implementation of the SPM measurement with higher accuracy and resolution.

Figure 4A:
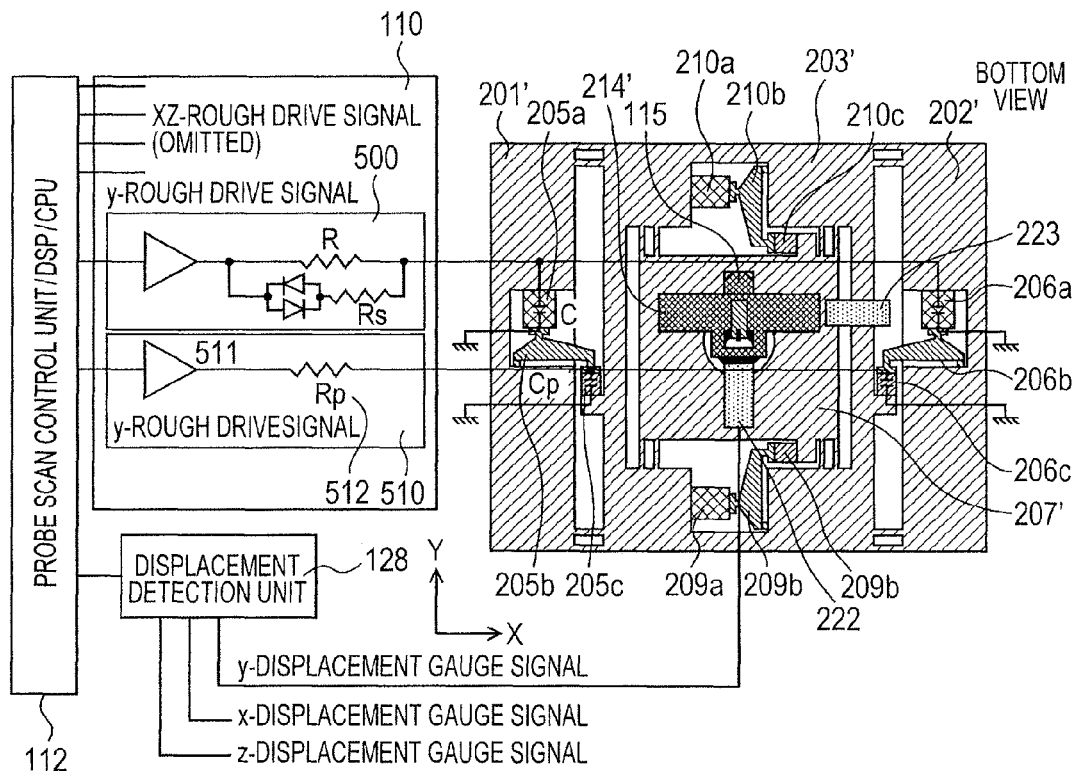
FIG. 4A is a plan view showing a structure of a main part of the probe drive unit and a driver circuit unit of the scanning probe microscope.
Figure 4B:
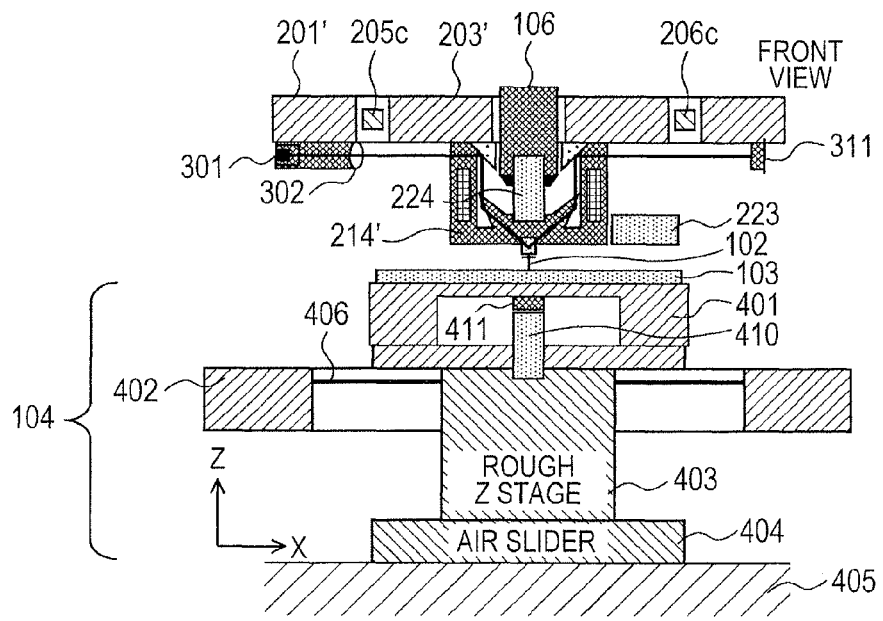
FIG. 4B is a plan view schematically showing a structure of the probe drive unit of the scanning probe microscope.

According to the embodiment shown in FIGS. 4A and 4B, a rough Z-stage 403 is mounted on an air slider 404. A sample stage 401, on which the sample 103 is mounted, is mounted on the rough Z-stage 403. The air slider 404 and the rough Z-stage 403 are joined with a rough XY-stage 402 and an elastic plate 406 so that the slider 404 is placed on a surface plate 405. The rough XY-stage 402 is fixed to the surface plate 405 with a structure (not shown). The observation position on the sample 103 may be selected by moving the air slider 404 in the XY-plane by means of the rough XY-stage 402 via the elastic plate 406. The aforementioned structure is made because its height is smaller than that of the general structure formed by stacking the X-stage, Y-stage and Z-stage so as to keep high rigidity at static state. This makes it possible to eliminate the oscillation of the sample 103 almost completely, which is optimal to the scanning probe microscope. Upon movement of the rough XY-stage 402, air may be blown between the air slider 404 and the surface plate 405 so as to make the friction force small. Alternatively, the air slider 404 is made slidably movable with respect to the surface plate 405 without blowing the air. The latter process is effective for measurement of the broad area on the sample ranging from several hundreds of micrometers to several tens of millimeters, especially when measuring the surface shape of the sample 103 using the probe 102 while sliding the air slider 404 on the surface plate 405 especially with planarity because no gap is generated by air.

When measuring the intermediate region on the sample 103 ranging from several tens to several hundreds of micrometers using the probe 102, the sample stage 401 is driven. This stage has the similar structure of the one at the probe side, which is driven by the piezoelectric device and uses the elastic guide. However, it is not provided with the part with the function corresponding to that of the Z-axis 214' of the stage at the probe side. The structure allows the design by focusing on the movable range rather than rigidity required for the high-speed scanning of the probe, resulting in the broader stage with the movable range of several hundreds of micrometers.

As it is difficult to scan over a broad range while ensuring high planarity, a displacement sensor 410 such as the capacitive sensor or the laser interference displacement gauge is used to measure positional change in the non scan direction upon scanning on the sample stage 401, that is, vertical movement, and the measurement results of the scanning probe microscope at the respective points are corrected with respect to height data. This makes it possible to realize the measurement with higher planarity.

Specifically, a flat target 411 is provided at the rear side of the sample stage 401 as shown in FIG. 4B so that the vertical movement of the target 411 during scanning is measured by the displacement sensor 410. For example, assuming that the planarity of the stage 401 during scanning is 10 nanometers, if accuracy of the displacement sensor 401 is 0.1 nanometers, the aforementioned correction ensures improvement of measurement accuracy with respect to the planarity as the measurement result of the scanning probe microscope from 10 to 0.1 nanometers. In the aforementioned explanation, the measurement results are corrected by the displacement gauge 410. However, height of the probe 102 may be corrected through direct feedback to the Z-stage 214 to follow up the vertical movement of the upper surface of the sample 103 caused by scanning of the sample stage 401.

The aforementioned correction will be described referring to FIG. 24. It is assumed that the actual surface profile of the sample 103 corresponds to an actual profile 451 (plotting by taking the x-axis as the position in the horizontal direction (X- or Y-direction), and the y-axis as the position in the Z-direction). There is a very small step-like configuration at a right end of the profile 451, which is often required to be quantitatively measured. While scanning the sample stage 401 on which the sample 103 is mounted in the XY-direction, vertical movement in the Z-direction as the non drive direction occurs owing to the characteristic of the guide mechanism of the scanning mechanism as indicated by the vertical movement of the stage 452 shown in FIG. 24. It is possible to suppress the vertical movement to be kept small by using the elastic guide. However, the vertical movement normally of several tens of nms will occur. The vertical movement of approximately 5 nm still occurs in spite of the well-made stage. For this, the profile to be measured is obtained by adding the actual profile 451 to the vertical movement 452 of the stage as indicated by the measured profile 453 shown in FIG. 24. Therefore, it is impossible to measure the subtle step-like configuration of the actual profile 451. If the vertical movement of the stage is allowed to be measured through another method, a corrected profile 454 may be obtained by subtracting the vertical movement 452 of the stage from the measured profile 453, thus ensuring correction.

The method of measuring the vertical movement of the stage may be realized by measuring the sample with secured planarity. However, it is difficult to secure the planarity of the sample. Furthermore, foreign substance or stain on the sample may lead to the error in the vertical movement profile 452 of the stage. Difference in the scanning characteristic of the stage between the time for measurement of the sample to be calibrated and the time for measuring the actual sample is influential. The vertical movement caused by the oscillation upon scanning of the stage may vary for each cycle. It is therefore difficult to conduct the complete correction. The displacement sensor 410 is used as shown in FIG. 4B to measure the vertical movement of the sample 103 during the sample measurement from the side opposite the probe (that is, the rear side of the sample stage 401). Besides the smooth vertical movement as indicated by the vertical movement profile 452 of the stage as shown in FIG. 24 owing to deviation of the sample stage 401 from the flat surface for scanning, the dynamic vertical movement of the sample stage 401, that is, the error caused by the oscillation may also be corrected.

When the target 411 is placed just below a measuring portion of the probe 102, the method shown in FIG. 4B ensures the accuracy. If the rough movement stage 403 moves to measure the part of the sample 103 other than the center with the probe 102, the error may occur in response to not only the vertical movement of the sample stage 401 but also movement that results in inclination change such as pitching and rolling simultaneously. In other words, if the measuring part of the vertical movement of the sample stage 401, which is measured by the displacement gauge 410 is out of alignment with the measuring part of the sample 103, which is measured by the probe 102 in the horizontal direction, the change in the height of the sample 103 at the position scanned by the probe 102 is out of alignment with the change in the height of the sample stage 401, which is measured by the displacement gauge 410 by the amount corresponding to the product of the misalignment and the inclination of the sample stage 401.

Figure 22A:
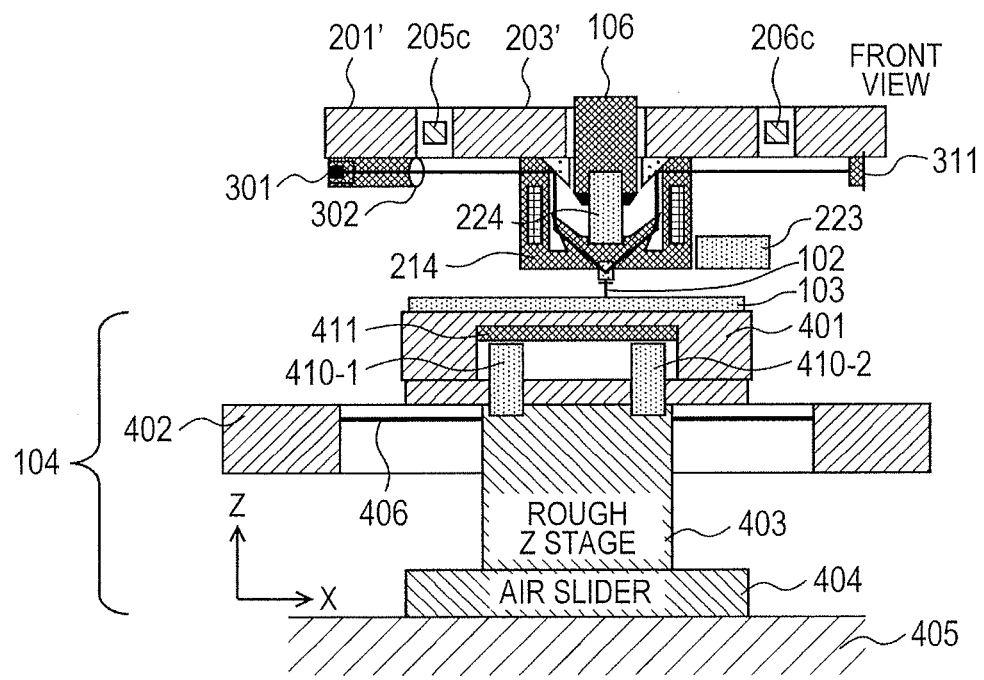
FIG. 22A is a side view of the sample stage provided with a plurality of displacement gauges.
Figure 22B:
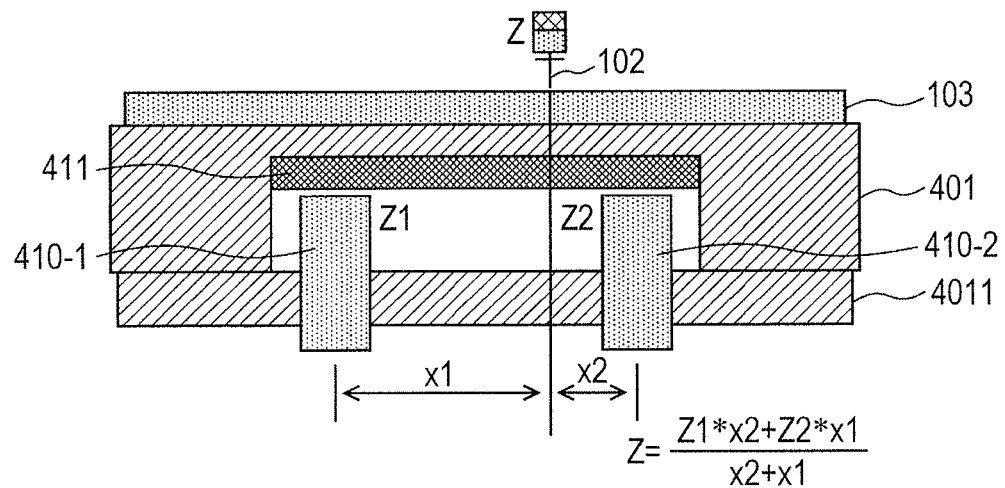
FIG. 22B is an enlarged view showing the plurality of displacement gauges attached to the sample stage.

Another embodiment will be described referring to FIG. 22 for the purpose of coping with the aforementioned situation. As FIGS. 22(a) and 22(b) show, a plurality of displacement gauges 410-1 and 410-2 are used to measure the target 411 attached to the rear surface of the sample stage 401. The vertical movement at the scanning position with the probe 102 will be obtained through the following process. It is assumed that measurement values of height measured by the two displacement gauges 401-1 and 410-2 are set to Z1 and Z2, respectively, and the distance of the measurement position of the probe 102 from the displacement gauge 410-1 is set to x1, and the distance of the measurement position of the probe 102 from the displacement gauge 410-2 is set to x2. A fluctuation Z in the height of the sample stage 401 at the measurement position of the probe 102 may be calculated using the formula of $Z=(Z1*x2+Z2*x1)/(x2+x1)$.

Figure 22C:
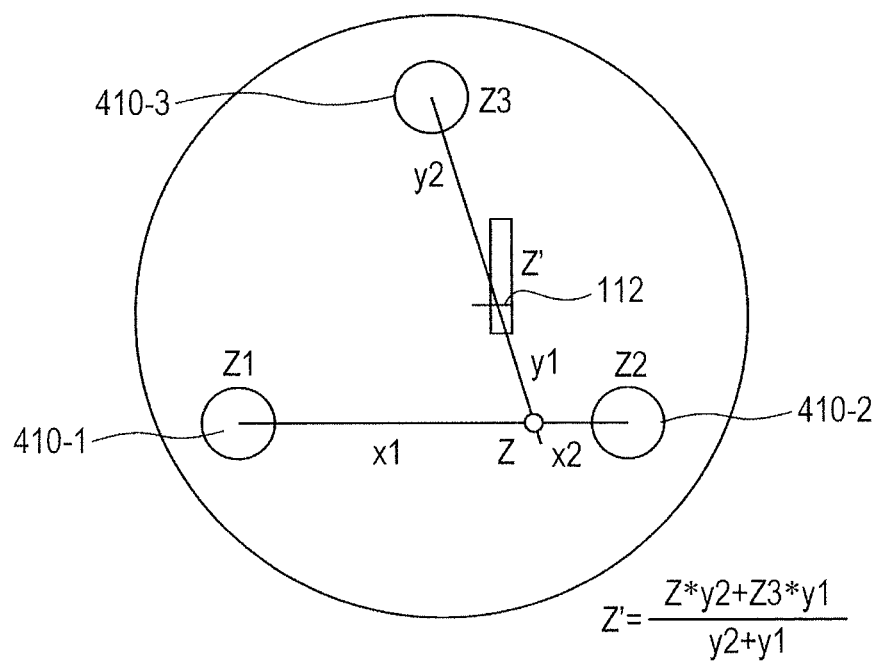
FIG. 22C is a plan view of the sample stage provided with the plurality of displacement gauges when seen from a rear surface.

The aforementioned process for obtaining the vertical movement data of the stage is employed when the sample 103 is laterally long, and misalignment of the measurement position with the probe 102 occurs only in the lateral direction. If the sample 103 extends in the depth direction with respect to the drawing of FIG. 22, and the measurement position of the probe 102 is required to be moved in the depth direction, an additional displacement gauge 410-3 (not shown in FIGS. 22(a) and 22(b)) is provided as shown in FIG. 22(c). Assuming that the distance of the scanning position with the probe 102 from the line formed by connecting the displacement gauges 410-1 and 410-2 is set to y1, and the distance from the displacement gauge 410-3 is set to y2, a fluctuation Z' in the height of the sample stage 401 at the measurement position with the probe 102 may be calculated through the formula of $Z'=(Z*y2+Z2*y1)/(y2+y1)$ using the calculated value Z and a height Z3 measured by the added displacement gauge 410-3.

Figure 23A:
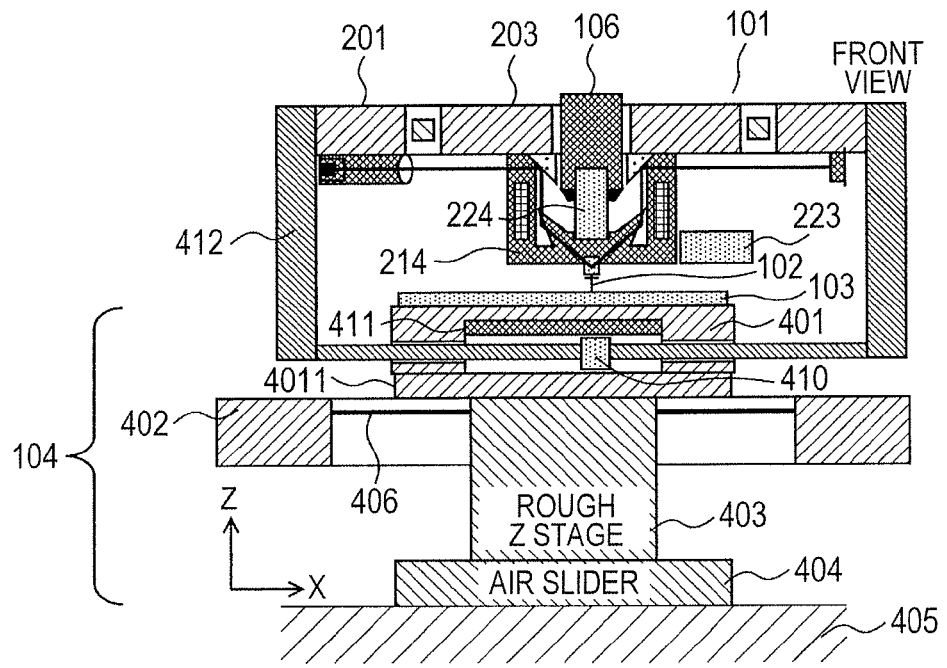
FIG. 23A is a side view of the sample stage configured to fix a fixed portion of a probe drive mechanism to a retainer member by means of a both-end support beam structure.

Another embodiment will be shown referring to FIG. 23. If the displacement gauge 410 may be kept substantially below the probe 102 at all the time irrespective of movement of the rough movement stage 403, use of only the single displacement gauge 410 allows accurate measurement of the vertical movement data 452 of the stage even if the sample stage 401 changes the inclination owing to pitching and rolling caused by the scanning. For this, the structure shown in FIG. 23(a) is employed by fixing a retainer member 412 to the holder 202 of the probe drive mechanism 101 using the both-end support beam structure, and further fixing the displacement gauge 410 to the retainer member 412. In this formation, the retainer member 412 and the displacement gauge 410 are kept from being in contact with the sample stage 401. This allows the position of the displacement gauge 410 to be kept substantially below the probe 102 all the time irrespective of movement of the sample 103 and the sample stage 401 caused by the rough movement stage 402.

Besides the vertical movement during the sample measurement as indicated by the vertical movement profile 45 of the stage shown in FIG. 24, which is caused by misalignment from the flat surface of the sample stage 401 for scanning, the dynamic vertical movement of the sample stage 401, that is, error owing to oscillation may also be corrected. It is possible to correct various types of changes between sides of the sample stage 402 and the upper probe scanning mechanism 101, specifically, time drift of the relative distance between the probe and the sample owing to the temperature change, and influence by the oscillation by measuring such change using the displacement gauge 410. In this case, it is necessary to configure the retainer member 412 to be unlikely to cause oscillation. The material selected to have the thermal expansion coefficient substantially the same as that of the probe drive mechanism 101 may improve correction accuracy of the drift caused by the temperature change.

Figure 23B:
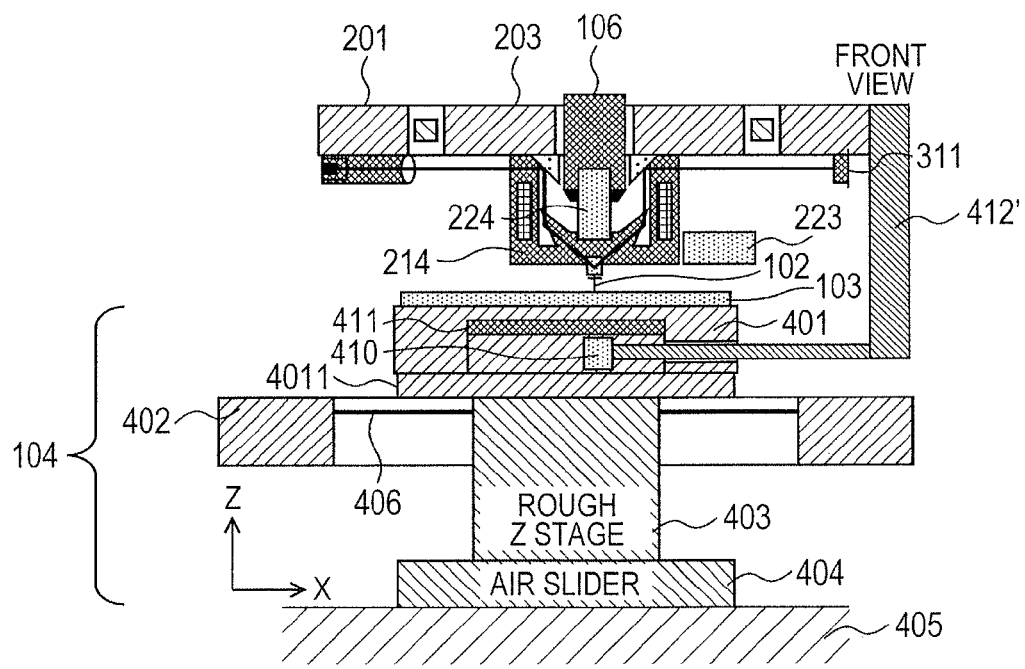
FIG. 23B is a side view of the sample stage configured to fix the fixed portion of the probe drive mechanism to the retainer member by means of a cantilever structure.

According to another embodiment as shown in FIG. 23(b), the displacement sensor 410 is gently retained by a retainer member 412' by means of the cantilever structure. A horizontal position of the displacement sensor 410 is always kept at the position substantially below the probe 102 by the retainer member 412'. As the displacement sensor 410 is pressed against a lower base portion 4011 of the sample stage 401 in the vertical direction, the distance between the lower base portion 4011 of the sample stage 401 and the target 411 attached to the operating portion of the stage 401 may be measured. The structure shown in FIG. 23(a) allows the correction with respect to the temperature drift, but has a problem of deteriorated correction accuracy upon oscillation of the displacement gauge 410 owing to low rigidity of the retainer member 412. On the contrary, the structure shown in FIG. 23(b) keeps high rigidity against the lower base portion 4011 of the sample stage 401 at the vertical position of the displacement gauge 410 in spite of low rigidity of the retainer member 412'. This provides the effect of preventing the risk of deteriorated correction accuracy caused by the oscillation.

In all the structures shown in FIGS. 4B, 22A, 23A and 23B, the X- and Y-scanning mechanisms are provided at the side of the sample stage 401. Accordingly, provision of at least the Z-axis drive function at the side of the probe drive mechanism 101 is sufficient. The XY-axis scanning function will be necessary as the component when the scanning with high resolution is required in the narrower range.

Measurement of the probe position in the X- and Y-directions will be described. An X-axis capacitive sensor 223 and a Y-axis capacitive sensor 222 are fixed to at least one of holders 201' and 202' by a mechanism (not shown), and are opposite the tip end of the Z-stage 214'. An opposite surface on the Z-stage is subjected to the precision grinding process. The X-axis capacitive sensor 223 and the Y-axis capacitive sensor 222 are provided on the X-axis and Y-axis which contain the field of view center position 212 (tip end position of the probe 102) of the objective lens in the XY-plane. This arrangement allows measurement of the stage displacement (displacement of the tip end position of the probe 102) at the field of view center position 212 of the objective lens. The structure hardly causes the Abbe error caused by the error in the yawing and pitching contained in the operation of the X- and Y-stages on which the Z-stage 214' is mounted.

Feedback control using the outputs of the displacement gauges allows scanning by accurately controlling the tip end position of the probe, and measurement of the shape and dimension by the high-accuracy SPM. Instead of the capacitive sensor, the displacement sensor with higher accuracy with the resolution of approximately 10 picometers such as the laser interference displacement gauge to be described later may be employed for realizing the SPM measurement with higher accuracy and resolution.

The following structure is provided in order to realize the high-speed measurement in the broad range and the high-accuracy measurement in the narrow range. Specifically, instead of the piezoelectric device 205 that has been described referring to FIGS. 2A to 2C, the fine/rough movement drive mechanism formed of elements 205a, 205b and 205c shown in FIGS. 4A and 4B is employed. Each of the piezoelectric devices 206, 209 and 210 may be replaced with the piezoelectric device 205, and accordingly, the piezoelectric device 205 will only be described (with respect to the piezoelectric devices 209 and 210, the Y-stage 203 may be replaced with the X-stage 207, and the Y displacement sensor 222 may be replaced with the X displacement sensor 223). A reference numeral 205a denotes the piezoelectric device that constitutes the rough movement mechanism, and is bonded to the displacement expansion mechanism 205b. The reference numeral 205b constitutes leverage, having one end fixed to the holder 201, intermediate portion pressed by the piezoelectric device 205a, and the other end bonded to the fine movement piezoelectric device 205c.

The displacement of the piezoelectric device 205a is expanded and transmitted to the piezoelectric device 205c by an amount corresponding to a ratio of the distance between the fixed portion of the displacement expansion mechanism 205b and the bonded portion with the 205c to the distance between the fixed portion and the bonded portion with the 205a (leverage magnification factor). For example, assuming that the leverage magnification factor is set to 5, and the expansion of the piezoelectric device 205a is set to 20 micrometers, one end of the piezoelectric device 205c will have a displacement of 100 micrometers. Furthermore, the piezoelectric device 205c transmits the displacement to the Y-stage 204 so as to be displaced. At this time, the displacement expansion system formed of the piezoelectric devices 206a, 206b and 206c also transmits the displacement to the Y-stage 204. As described above, if the displacement resolution of each of the piezoelectric devices 205a and 206a is 1 nanometer, the displacement noise transmitted to the stage 204 will be magnified by 5 times, that is, 5 nanometers.

The piezoelectric device 205c (see FIG. 4A) is the fine movement piezoelectric devices, which is configured to expand by approximately 1 micrometer upon application of the voltage at 100V. Then the displacement of the fine movement piezoelectric device is added to displace the Y-stage. Assuming that the voltage noise is set to 5 mV, the noise of the fine movement piezoelectric device will be 50 picometers. At this time, if the response of the fine movement piezoelectric devices 205c is faster than the rough movement piezoelectric devices 205a, the displacement sensor 222 detects the position of the Y-stage 203' in the Y-direction to conduct feedback to allow the Y-stage 203' to control the Y-stage 203' with the resolution in substantially the same order as that of the displacement sensor. As described later referring to FIG. 15, the feedback control is realized by allowing a probe scanning control unit 112 to process the stage displacement data detected by a stage displacement detection unit 128, and driving the piezoelectric device via the probe drive control unit 110. A rough movement piezoelectric device driver 500 and a fine movement piezoelectric device driver 510 are provided for the respective axes in the probe drive control unit 110.

Figure 5A:
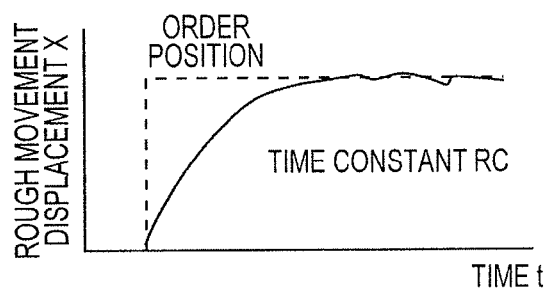
FIG. 5A is a graph representing a change with time in a rough movement displacement of a piezoelectric device driver of a generally employed scanning probe microscope when the time constant is small.
Figure 5B:
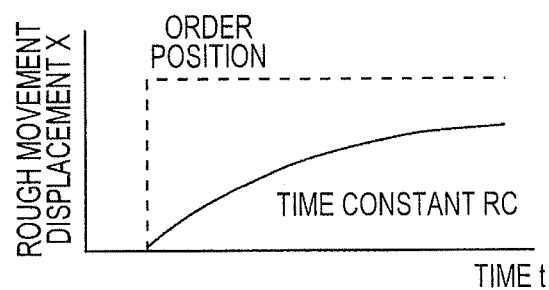
FIG. 5B is a graph representing a change with time in a rough movement displacement of the piezoelectric device driver of the scanning probe microscope when the time constant is large.

The fine movement piezoelectric device may fail to cancel the noise unless the response at the rough movement side is sufficiently small. In case that the piezoelectric device serves as the load with the capacity C electrically. Assuming that it is driven by the driver amplifier with the output resistance R, when the capacity of the driver amplifier is large, and the output resistance R may be made small, the time constant RC becomes short as shown in FIG. 5A, resulting in quick response to the order position input through the amplifier. However, the noise after reaching the ordered position is large, which cannot be sufficiently cancelled by the fine movement piezoelectric device. If the output resistance is set to be large as indicated by FIG. 5B, the noise may be reduced, but the time constant RC is increased. This may cause the problem of considerably retarding the response upon long distance positioning that cannot be covered by the fine movement piezoelectric device.

Figure 6A:
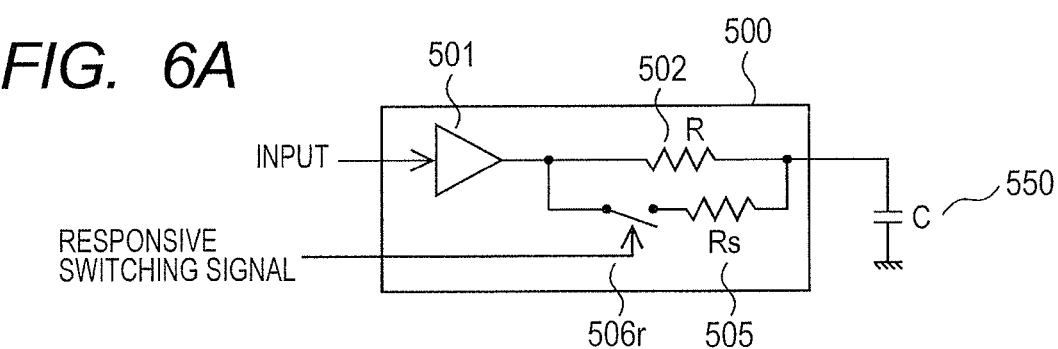
FIG. 6A is a view of a circuit structure of a rough movement piezoelectric device driver for switching of a high speed driving output resistance Rs in accordance with an external responsive switching signal.

As the structure of the rough movement piezoelectric device driver 500 shown in FIGS. 6A to 6F indicates, the response of the rough movement piezoelectric device is accelerated by the responsive switching mechanism upon the long distance positioning, and the response is retarded in the static state to allow the fine movement piezoelectric device to conduct the positioning. Referring to FIG. 6A, the rough movement piezoelectric device is shown as a capacitor 550 with the capacity C. A driver amplifier 501 is connected to the rough movement piezoelectric device 550 via an output resistance R (502). A high speed driving output resistance Rs (505) is connected to the output resistance 502 in parallel via a switcher 506r. If Rs<<R, the output resistance becomes RsR/(Rs≈Rs upon turning of the responsive switching signal ON so as to respond at high speeds with the time constant RsC. When the switcher 506r is in OFF state, the response is performed at low speeds with the time constant RC in the low noise mode. When performing the long distance positioning, the switcher 506r is turned ON, and then OFF upon approach to the target. This may allow both the high speed positioning and stabilization in the static state.

Figure 6B:
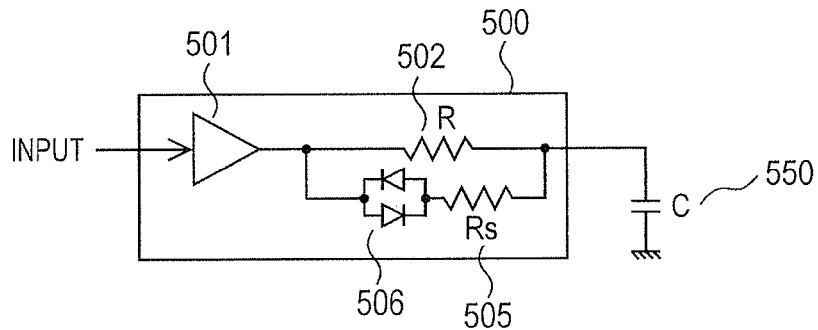
FIG. 6B is a view of a circuit structure of the rough movement piezoelectric device driver for switching of the high speed driving output resistance Rs automatically performed by inserting a pair of reversely directed diodes.
Figure 6C:
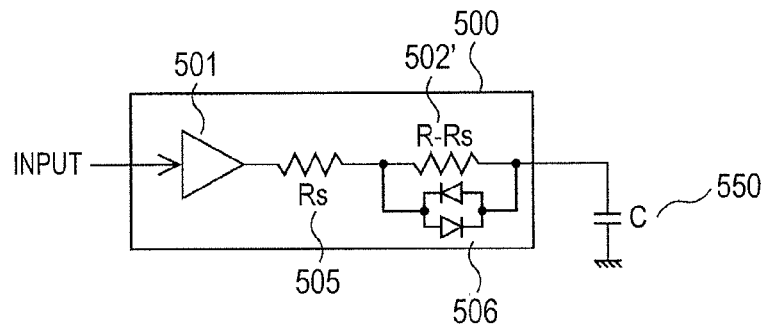
FIG. 6C is a view of a circuit structure of the rough movement piezoelectric device driver for switching of the high speed driving output resistance Rs automatically performed by inserting a pair of reversely directed diodes and divided resistances.

In the embodiment referring to FIG. 6A, the switching is explicitly performed. However, it is possible to perform the switching automatically. Referring to FIG. 6B, instead of the responsive switcher 506r, a structure 506 formed by connecting oppositely directed diodes in parallel is inserted. Assuming that the voltage drop of the diode in the forward direction is set to Vd, and the current flowing through the output resistance 502 exceeds the Vd/R, the diode is turned ON. This may apply the current to the high speed response resistance Rs to accelerate the response. If the voltage at both ends of the piezoelectric device 550 is brought into close to the target value, the current becomes low. Then the switcher 506 is turned OFF to deteriorate the response, and accordingly, reduce the noise. Alternatively, the structure as shown in FIG. 6C may provide the same effect. A resistance 502' as R-Rs is connected to the resistance Rs (505) in series to form the output resistance, and the switcher 506 formed of the diode is connected to the resistance 502' in parallel. If the current flowing through the resistance 502' exceeds the Vd/(R-Rs), the diode is turned ON, and the current flows to the high speed response resistance Rs to accelerate the response.

Figure 6D:
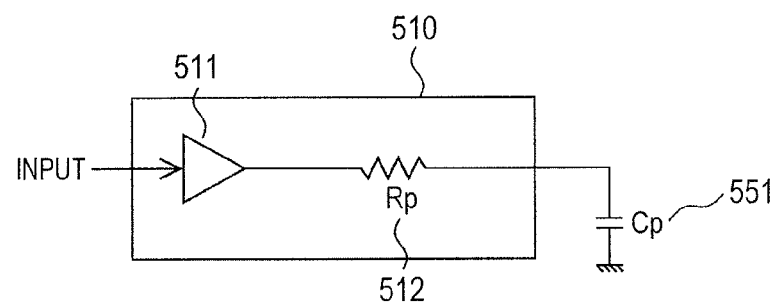
FIG. 6D is a view of a circuit structure of a fine movement piezoelectric device driver.

Referring to FIG. 6D, a fine movement piezoelectric device driver 510 is connected to a piezoelectric device 551 with capacity Op via an output resistance Rp (512) from a driver amplifier 511. The Rp may be set to the value so as to realize the response required by the time constant RpCp.

Figure 6E:
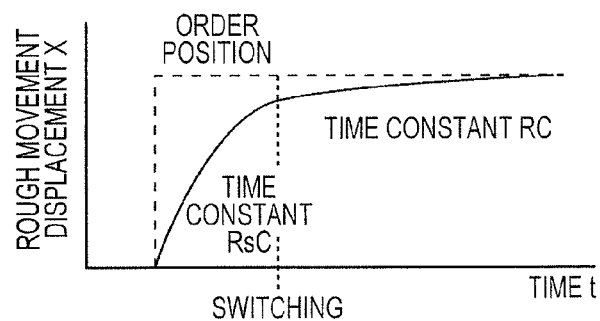
FIG. 6E is a graph representing a change with time in the rough movement displacement with respect to step-like inputs.
Figure 6F:
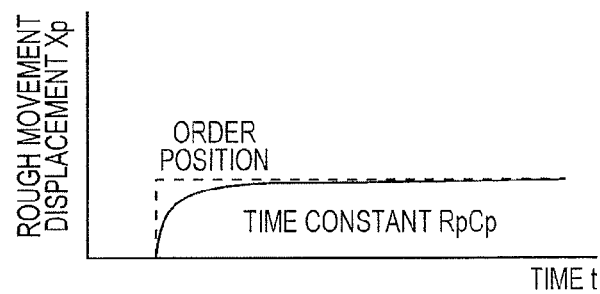
FIG. 6F is a graph representing a change with time in the fine movement displacement with respect to the step-like inputs.

Change in the displacement with respect to the step-like input position will be shown in FIGS. 6E and 6F. As FIG. 6E shows, a rough movement displacement X initially responds at high speeds with the time constant RsC. As the difference between the order position and the displacement X becomes smaller, the time constant at the response is reduced to the RC through the switcher 506 or 506r so that the position X slowly changes while having the small displacement noise. The fine movement displacement Xp displaces at high speeds with the time constant RpCp as shown in FIG. 6F. Since the movable range is small, the order position displaces within the movable range although it exceeds the range thereof, while keeping the displacement noise small.

Figure 7:
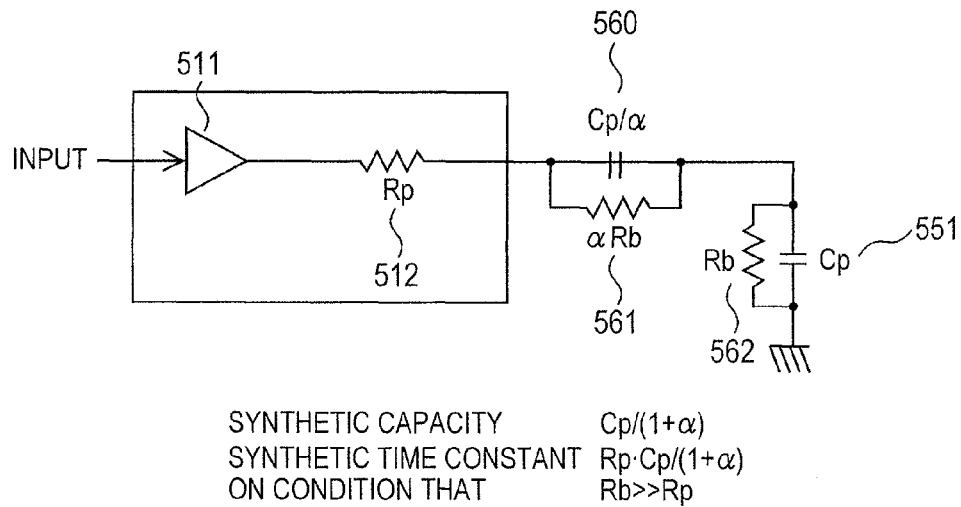
FIG. 7 is a view representing an embodiment that further improves the resolution of the fine movement piezoelectric device driver.

Referring to FIG. 7, if the capacitor is inserted between the fine movement piezoelectric device and the driver circuit in series, the voltage is divided into partial pressures at a ratio inverse to that of the capacity between the piezoelectric device and the capacitor. This may improve noise, that is, the displacement resolution of the fine movement piezoelectric device. As the drawing shows, the driver amplifier 511 drives the piezoelectric device 551 via the output resistance 512 (resistance value Rp), and further a capacitor 560 with capacity $1/\alpha$ of the capacitance Op of the piezoelectric device 551. This may divide the voltage of the capacitors 560 and 551 at both ends into partial pressures at the ratio of $\alpha$ to 1, thus reducing the noise to $1/(1+\alpha)$. Each resistance of $\alpha$Rb and Rb inserted in parallel with the capacitors serves to prevent gradual displacement of the partial pressure ratio owing to leak of electrical charge of the capacitor with the high resistance in the MO order, which sufficiently makes the time constant RbCp large. For example, assuming that the $\alpha$ is set to 4, in the example of the aforementioned fine movement piezoelectric device, the displacement resolution becomes 10 picometers that is ⅕ of 50 picometers. In return for this, the movable range of the fine movement piezoelectric device becomes 0.2 micrometers as ⅕ of 1 micrometer.

Figure 8A:
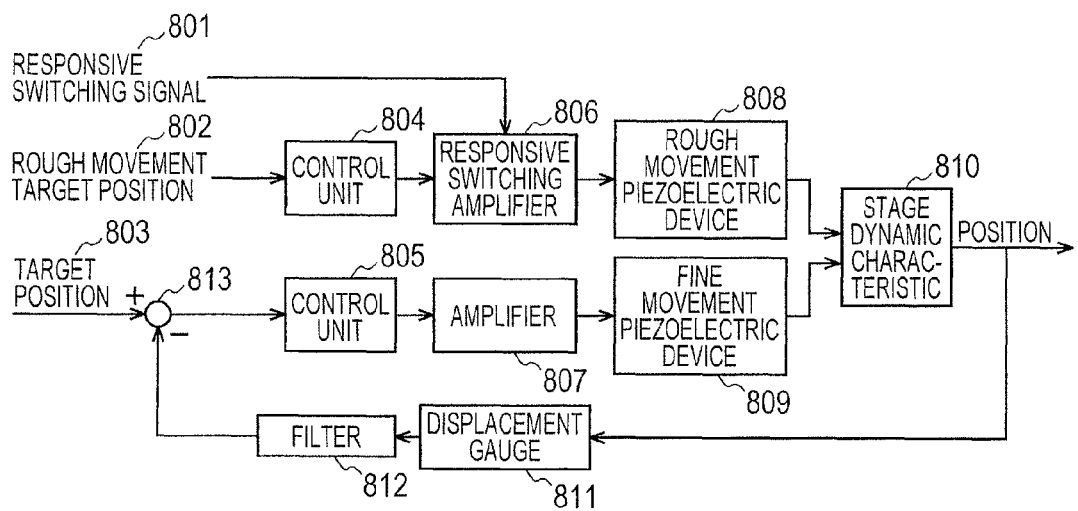
FIG. 8A is a control block diagram where a responsive switching amplifier and fine/rough movement piezoelectric devices are used, indicating an open control structure.

Operations of the probe scanning control unit 112 according to the present invention will be described referring to FIGS. 8A to 8C. Referring to FIG. 8A, a rough movement target position 802 is given under an open control where feedback of the measurement results of the displacement gauge is not performed. A responsive switching signal 801 keeps the response of a responsive switching amplifier 806 at high speeds from change in the rough movement target position 802 until the response is stabilized. Thereafter, the response is switched to the low speed (low noise). The structure for automatically switching the response without using the responsive switching signal 801 from outside may be available. The position of the stage is detected by a displacement gauge 811, and is appropriately filtered by a filter 812 to reduce the noise, which is compared with a target position 803 by the comparator 813. The resultant error is transmitted to an amplifier 807 via a control unit 805 so as to conduct the feedback control of a fine movement piezoelectric device 809. The control unit herein denotes the device that outputs the value obtained by multiplying the appropriately filtered input by the gain. This is generally used in the control theory. For example, the control unit called PID controller provides three kinds of values each formed by multiplying the input value, the integrated value thereof, and the derivative value by different gains individually, and outputs the value summed up of those three values. The aforementioned structure allows both high speed response in the broad range and the high-accuracy positioning.

Figure 8B:
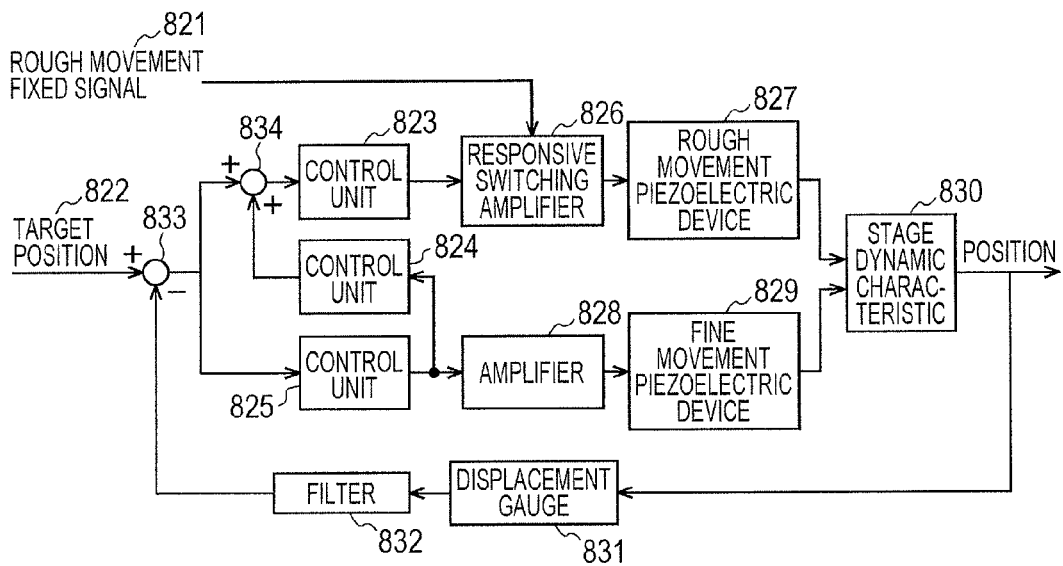
FIG. 8B is a control block diagram where the responsive switching amplifier and the fine/rough movement piezoelectric devices are used, indicating an example that uses a signal with reduced noise by filtering a stage position detection signal.

FIG. 8B illustrates another possible structure that filters a detection position 831 of the stage through a filter 832 to reduce the noise, and the resultant value is compared with a target position 822 in 833. The resultant positional error is passed to respective control units 823 and 825 for rough movement and fine movement, respectively to drive a rough movement piezoelectric device 827 via the responsive switching amplifier 826, and to drive a fine movement piezoelectric device 829 via a normal amplifier 828. An input to the fine movement amplifier 828 is added to a control amount to the rough movement piezoelectric device 827 via another control unit 824. The operation of the control unit increases the integrating operation. If the state where the fine movement piezoelectric device 829 is expanded on average is prolonged, the resultant amount is added to the control amount to the rough movement piezoelectric device 827 to expand the rough movement piezoelectric device 827. Then the fine movement piezoelectric device 829 in turn is contracted. This applies to the case where the expansion and contraction are inverted. This makes it possible to automatically adjust the displacement of the rough movement piezoelectric device so that the fine piezoelectric device is usable at the center of the operation range on average. The embodiment shown in the drawing allows the responsive switching amplifier to fix the output value in accordance with the rough movement fixed signal. This makes it possible to explicitly stop operations of the rough movement piezoelectric device to realize positioning with low noise when using the SPM in the scanning range that can be covered by the fine movement piezoelectric device.

Figure 9A:
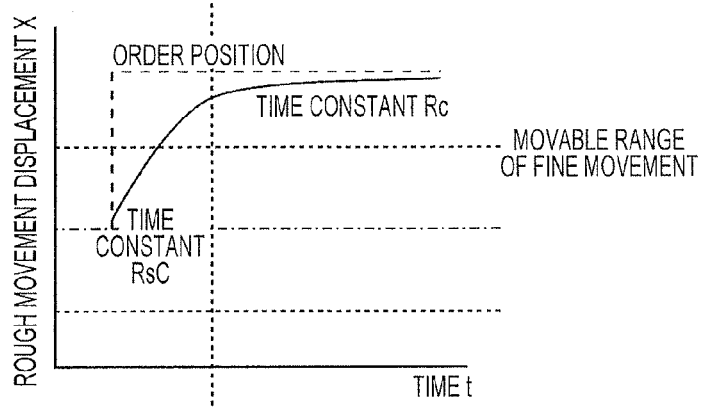
FIG. 9A is a graph showing a state of change with time in the rough movement displacement upon large step-like change in an order position.
Figure 9B:
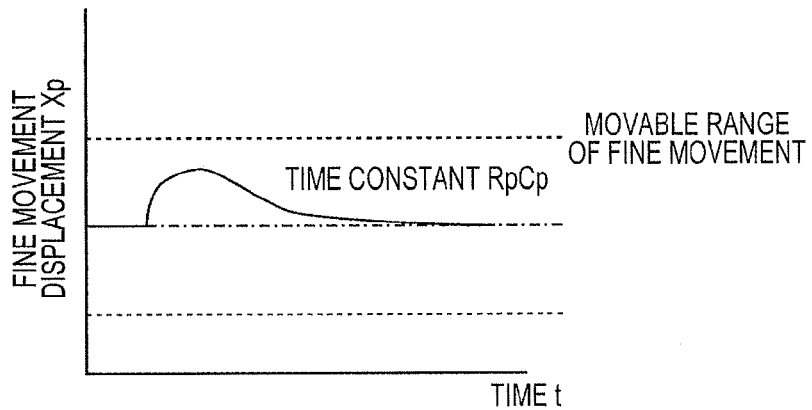
FIG. 9B is a graph showing a state of change with time in the fine movement displacement upon large step-like change in the order position.
Figure 9C:
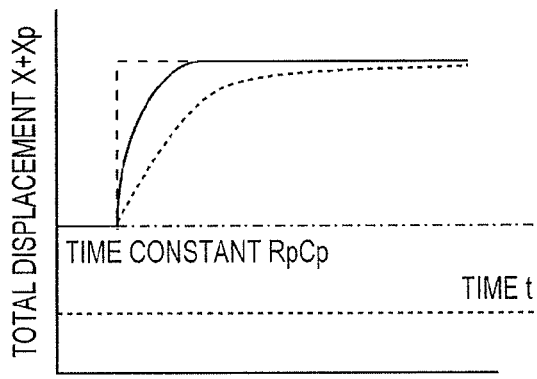
FIG. 9C is a graph showing a state of change with time in a total displacement upon large step-like change in the order position.

The displacement in the aforementioned case will be described referring to FIGS. 9A to 9C. When the order position is largely changed stepwise, the positional error is transmitted to the rough movement piezoelectric device amplifier and the fine movement piezoelectric device amplifier via the respective control units, and the rough movement displacement and the fine movement displacement are changed as shown in FIGS. 9A and 9B, respectively. If the change in the order position is large, the rough movement displacement shown in FIG. 9A responds at high speeds and changes with the time constant $RsC$. Meanwhile, the fine movement displacement Xp shown in FIG. 9B changes at high speeds but the displacement gradually shifts toward the rough movement displacement X as this state is added to the input of the rough movement piezoelectric device amplifier via the control unit. As the total displacement X+Xp shown in FIG. 9C approaches the ordered position, the fine movement displacement returns to zero (intermediate position) again. The total displacement at this time changes as indicated by the solid line as the fine movement displacement is added compared with the displacement only of the rough movement piezoelectric device as indicated by the dashed line. Therefore, the time constant changes at high speed in accordance with the time constant $RpCp$ of the fine movement displacement.

Figure 8C:
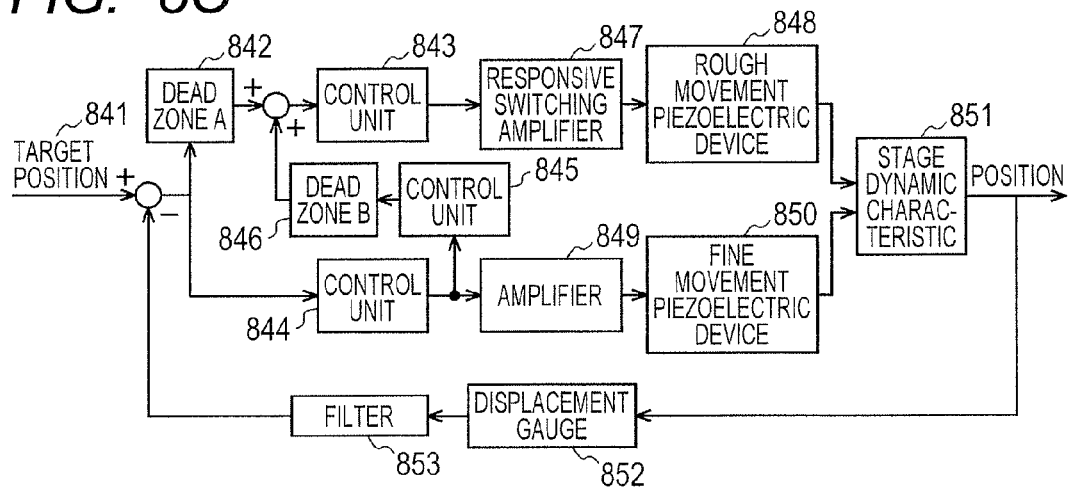
FIG. 8C is a control block diagram where the responsive switching amplifier and the fine/rough movement piezoelectric devices are used, indicating an example structure for controlling by providing a dead-zone.

Another possible structure shown in FIG. 8C provides the improved displacement noise effect by completely stopping the operation of the rough movement piezoelectric device in the static state without controlling the rough movement fixed signal as described referring to FIG. 8B. This structure is different from the one shown in FIG. 8B in a dead-zone. A dead-zone A842 is intended not to drive a rough movement piezoelectric device 848 when the positional error is within a certain range. Assuming that the input is set to X, the output is set to Y, and the dead-zone is set to +/−W, the values expressed as Y=X+W (X<−W), Y=0(−W<x<W), and Y=X−W(W<X) are output. The dead-zone is set to the range slightly smaller than the movable range of a fine movement piezoelectric device 850 so as to allow the rough movement piezoelectric device 848 to be driven automatically only when the fine movement piezoelectric device 850 cannot perform positioning. Another dead-zone 3846 may also be provided to allow the rough movement piezoelectric device to be driven only when the state where the fine movement piezoelectric device 850 has been deviated from the center of the drive range is continued in response to turning of the output from the dead-zone B ON owing to increase in the integrated output of the control unit 845 just to the front of the dead-zone B846.

Figure 10A:
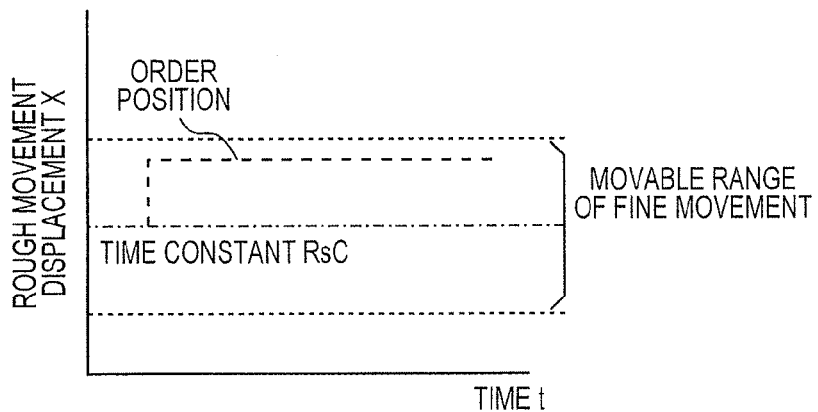
FIG. 10A is a graph showing a state of change with time in the rough movement displacement upon step-like change in the order position, which is smaller than the level of the dead-zone.
Figure 10B:
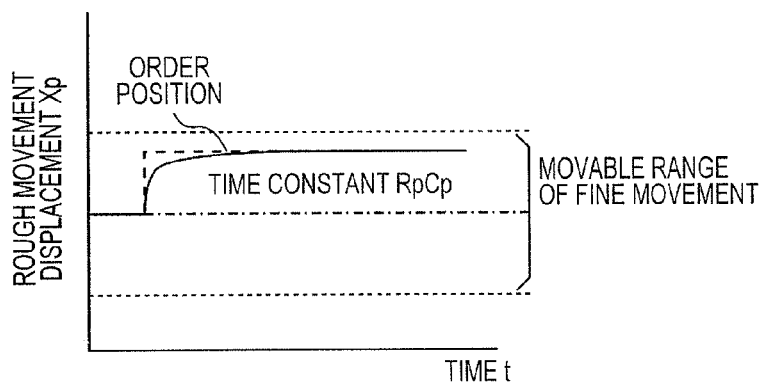
FIG. 10B is a graph showing a state of change with time in the fine movement displacement upon step-like change in the order position, which is smaller than the level of the dead-zone.
Figure 10C:
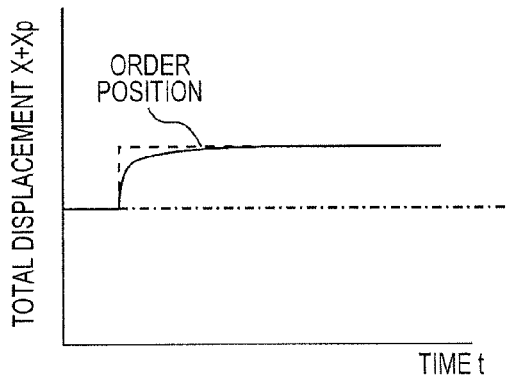
FIG. 10C is a graph showing a state of change with time in the total displacement upon step-like change in the order position, which is smaller than the level of the dead-zone.

The aforementioned displacement state will be described referring to FIGS. 10A to 10C. Referring to FIG. 10A, when the step-like change in the ordered position is small, and it is smaller than the dead-zone W set within the movable range of the fine movement, or the rough movement fixed signal is explicitly turned ON, the rough movement displacement X does not change. In this case, the positional error is transmitted to the fine movement piezoelectric device amplifier with the dead-zones A and B out of the signal path. The fine movement displacement Xp responds with the time constant $RpCp$ as indicated by FIG. 10B so as to follow up the order position as the total displacement as indicated by FIG. 10C.

Another structure that allows a single amplifier to drive the rough movement piezoelectric device 550 and the fine movement piezoelectric device 551 will be described referring to FIG. 11A. The driver amplifier 501 drives the fine movement piezoelectric device (551) with capacity Op via the output resistance Rp (512). The driver amplifier 501 is connected to the rough movement piezoelectric device 550 via the output resistance R (502). The high-speed driving output resistance Rs (505) is connected to the output resistance 502 in parallel via the switcher 506r. If Rs<<R, the output resistance becomes $RsR/(Rs+R) \approx Rs$ upon turning of the responsive switching signal ON so as to respond at high speeds with the time constant $RsC$. When the switcher 506r is in OFF state, the response is performed at low speeds with the time constant RC in the low noise mode. When performing the long distance positioning, the switcher 506r is turned ON, and then OFF upon approach to the target. This may allow both the high speed positioning and stabilization in the static state.

Figure 11A:
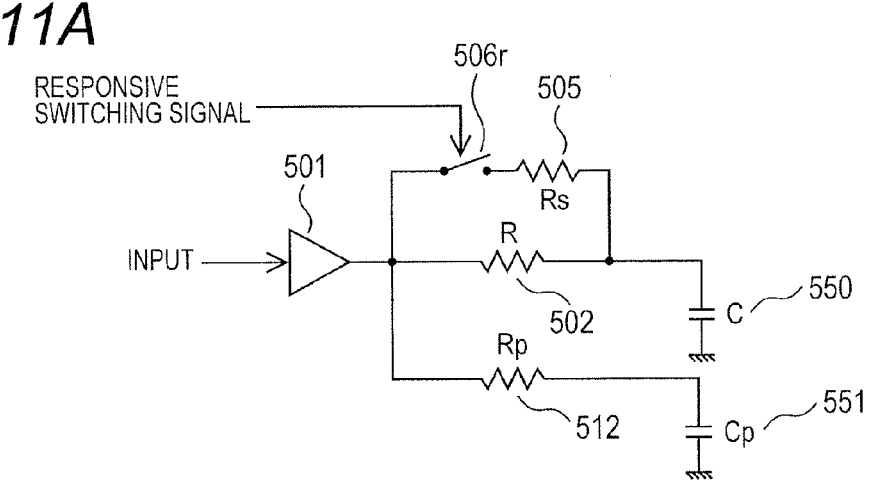
FIG. 11A is a circuit diagram showing a structure that uses only one amplifier to switch between the rough movement piezoelectric device and the fine movement piezoelectric device so as to be driven through an external input.
Figure 11B:
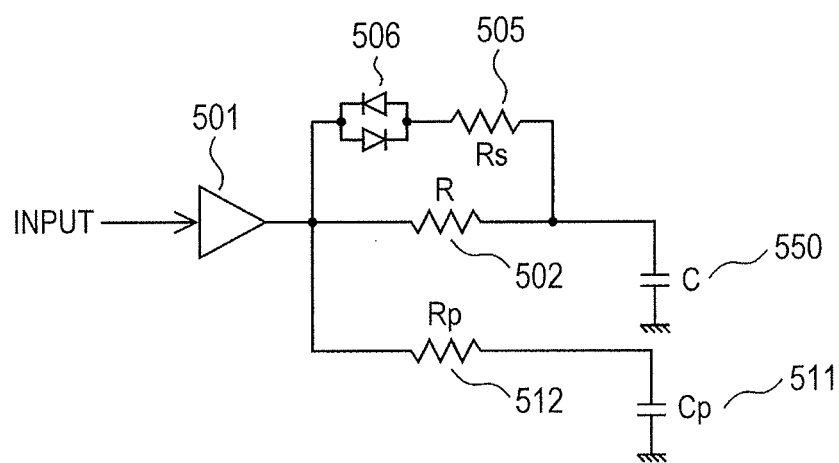
FIG. 11B is a circuit diagram showing a structure that uses only one amplifier to automatically switch between the rough movement piezoelectric device and the fine movement piezoelectric device so as to be driven.

In the embodiment referring to FIG. 11A, the switching is explicitly performed. However, it is possible to perform the switching automatically. Referring to FIG. 11B, instead of the responsive switcher 506r, oppositely directed diodes are inserted in parallel. Assuming that the voltage drop of the diode in the forward direction is set to Vd, and the current flowing through the output resistance 502 exceeds the Vd/R, the diode is turned ON. This may apply the current to the high speed response resistance Rs to allow the response at higher speeds. If the voltage at both ends of the piezoelectric device 550 is brought into close to the target value, the current becomes low. Then the switcher 506 is turned OFF again to retard the response while reducing the noise in turn. The difference in the response between the rough movement amplifier and the fine movement amplifier allows the fine movement piezoelectric device to respond with respect to positioning at the small stroke automatically. The rough movement piezoelectric device and the fine movement piezoelectric device simultaneously respond with respect to the positioning at large stroke. As the position is brought into close to the target position, the response of the rough movement amplifier is retarded so as to allow the fine movement piezoelectric device to respond.

Figure 12A:
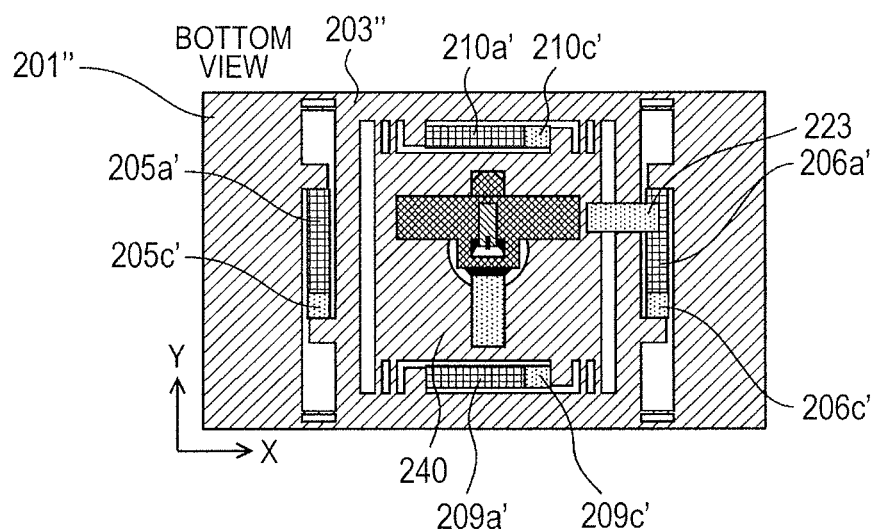
FIG. 12A is a plan view showing another example of a mechanism for driving the probe.
Figure 12B:
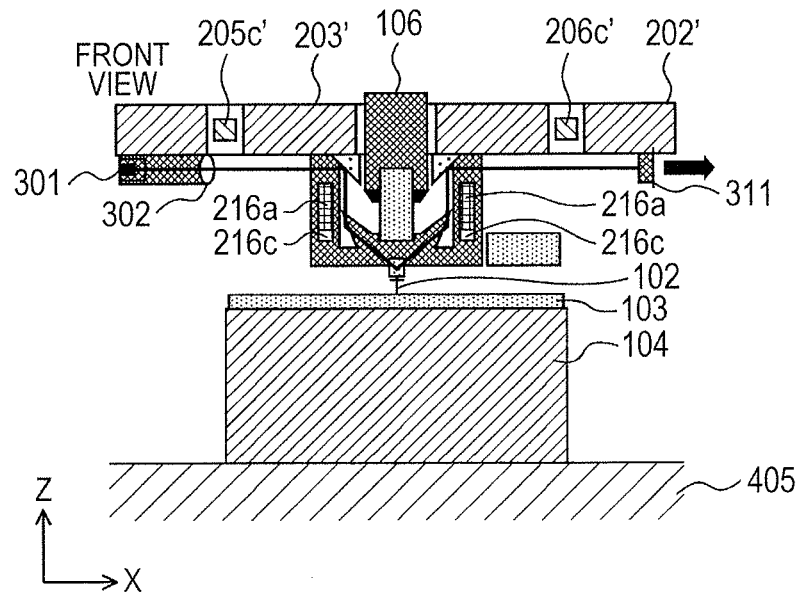
FIG. 12B is a front view showing another example of the mechanism for driving the probe.

Another structure that allows the probe 102 as described referring to FIGS. 4A and 4B to perform both high speed scanning in the broad range and accurate scanning in the narrow range will be described referring to FIGS. 12A and 12B. As the structure shown in FIGS. 12A and 12B is substantially the same as the one described referring to FIGS. 2A to 2C, only the different structure will be described. Two kinds of rough movement piezoelectric devices 205a', 206a' connected with each other, and fine movement piezoelectric devices 205c', 206c' connected with each other correspond to the piezoelectric devices 205 and 206 of the Y-axis, respectively. The structure described referring to FIGS. 4A and 4B realizes the rough movement by expanding the displacement of the piezoelectric device. Meanwhile, the structure shown in FIGS. 12A and 12B realizes the rough movement by increasing the length of the piezoelectric device. This applies to those of the X-axis. Two kinds of rough movement piezoelectric devices 209a', 210a' connected with each other, and fine movement piezoelectric devices 209c', 210c' connected with each other correspond to the piezoelectric devices 209 and 210 of the X-axis, respectively. This may also apply to those of Z-axis. Two kinds of rough movement piezoelectric devices 216a, 217a connected with each other, and fine movement piezoelectric devices 216c, 217c connected with each other correspond to the piezoelectric devices 216 and 217 of the Z-axis, respectively. They are driven by the circuit similar to the one as described referring to FIGS. 4A and 4B so as to allow both the high speed scanning in the broad range and the high-accuracy scanning in the narrow range.

In this embodiment, the sample stage 104 is formed using general XYZ-stage. However, use of the stage as described referring to FIG. 4B may further improve the accuracy.

Figure 13:
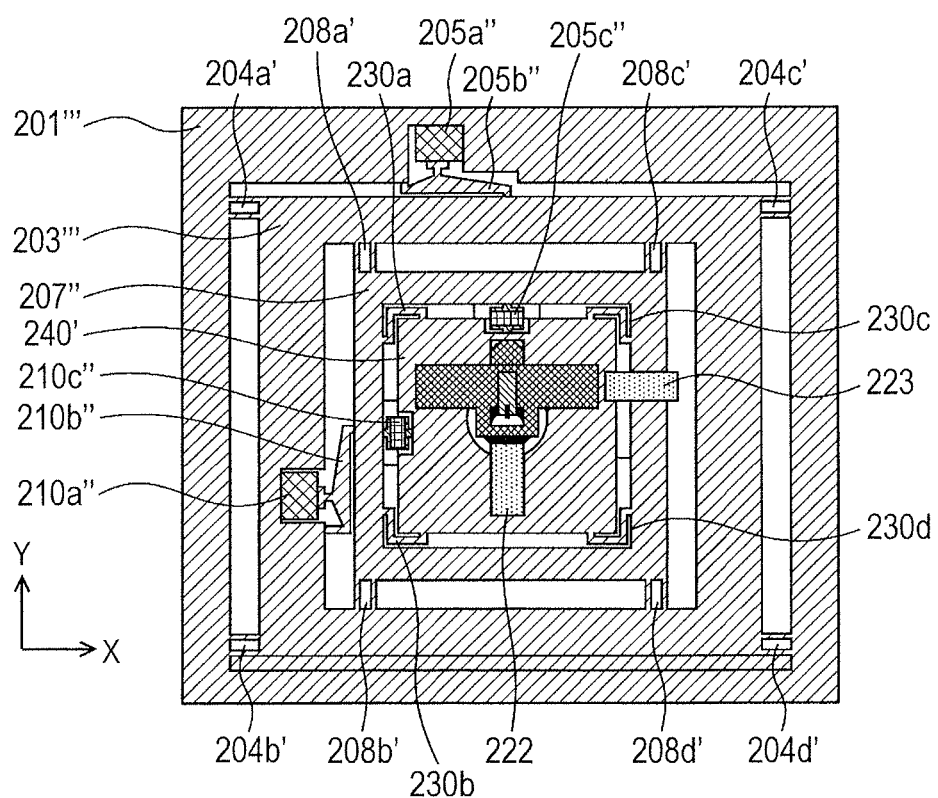
FIG. 13 is a plan view showing another example of the mechanism for driving the probe.

Another structure that allows the probe 102 as described referring to FIGS. 4A and 4B to perform both high speed scanning in the broad range and accurate scanning in the narrow range will be described referring to FIG. 13. A Y-axis rough movement piezoelectric device 205a" is fixed to a holder 201''', which drives a Y-stage 203''' via a displacement expansion mechanism 205b" using the principle of leverage. The Y-stage 203" is supported at the holder 201''' so as to smoothly move only in the Y-direction via elastic deformation portions 204a',204b', 204c' and 204d'. An X rough movement piezoelectric device 210a" is fixed to the Y-stage 203''', which drives an X-stage 207" via a displacement expansion mechanism 210b" using the principle of leverage. An X-stage 207" is supported so as to smoothly move with respect to the Y-stage 203''' only in the X-direction via elastic deformation portions 208a', 208b', 208c' and 208d'. A fine movement stage 204' is supported inside the X-stage 207" so as to smoothly move only in the XY-direction via elastic deformation portions 230a, 230b, 230c and 230d. The elastic deformation portions 230a, 230b, 230c and 230d are arranged to form an L-like shape so as to have smooth elastic deformations both in the X- and Y-directions.

The fine movement stage 240' is driven in the X- and Y-directions by the fine movement X piezoelectric device 210c" and a fine movement Y piezoelectric device 205c", respectively. The fine movement piezoelectric devices 210c" and 205c" are bonded to the X-stage 207" and the fine movement stage 240', respectively using an elastic hinge so as to transmit the force only in the expanding/contracting direction of the piezoelectric device. The displacement of the probe 102 in the XY-direction is measured by the X displacement gauge 223 and Y displacement gauge 222. They are driven by the circuit similar to the one as described referring to FIGS. 4A and 4B to allow both the high speed scanning in the broad range and the high-accuracy scanning in the narrow range.

Figure 14:
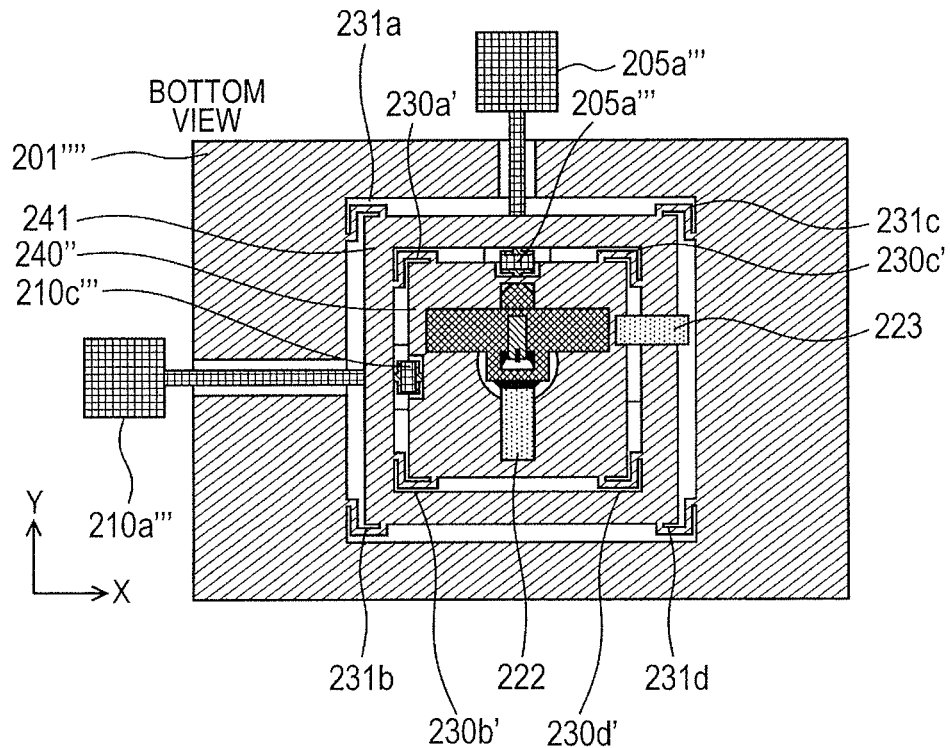
FIG. 14 is a plan view showing another example of the mechanism for driving the probe.

Another structure that allows the probe 102 as described referring to FIGS. 4A and 4B to perform both high speed scanning in the broad range and accurate scanning in the narrow range will be described referring to FIG. 14. A rough movement stage 241 is in a holder 201"" so as to smoothly move only in the XY-direction via elastic deformation portions 231a, 231b, 231c and 231d. The rough movement stage 241 is driven by an externally provided X rough movement actuator 210a''' and a Y rough movement actuator 205a''' in the X- and Y-directions, respectively. Each of those actuators may be formed as a large-sized piezoelectric device, and a rotation-linear motion converting mechanism formed of a rotary motor such as a voice coil motor, servo motor and a step motor, and a ball screw.

A fine movement stage 240" is supported inside the rough movement stage 241 via elastic deformation portions 230a', 230b', 230c' and 230d' so as to smoothly move only in the XY-direction. The elastic deformation portions 230a', 230b', 230c' and 230d' are arranged to form an L-like shape so as to have smooth elastic deformations both in the X- and Y-directions. The fine movement stage 204" is driven by a fine movement X piezoelectric device 210c''' and a fine movement Y piezoelectric device 205c''' in the X- and Y-directions, respectively. The fine movement X piezoelectric device 210c''' and fine movement Y piezoelectric device 205c''' are bonded to the rough movement stage 241 and the fine movement stage 240", respectively using the elastic hinge so as to transmit the force only in the expanding/contracting direction of the piezoelectric device.

The displacement of the probe 102 in the XY-direction is measured by the X displacement gauge 223 and the Y displacement gauge 222. They are driven by the circuit similar to the one as described referring to FIGS. 4A and 4B to allow both the high speed scanning in the broad range and the high-accuracy scanning in the narrow range. However, the appropriate responsive switching or rough movement fixation are required in accordance with each type of the actuators 210a''' and 205a'''. For example, a brake shoe (not shown) is pressed against a rod that presses the rough movement stage 241 using an electromagnetic brake for fixing under the frictional force. Alternatively, the rod that presses the rough movement stage 241 is provided with a fluid damper (not shown) to reduce the flow channel of the orifice of the damper to retard the response. As another example, external coils are inserted in series between the coil of the voice coil motor and the driver amplifier. If short circuit occurs between both ends of the external coil by the relay, the high speed response is realized. If the relay is released, the current flowing through the coil, that is, the time constant upon response of the force generated by the voice coil motor is increased in proportion to the rate of increase in the coil inductance. This may reduce the displacement noise.

Figure 15A:
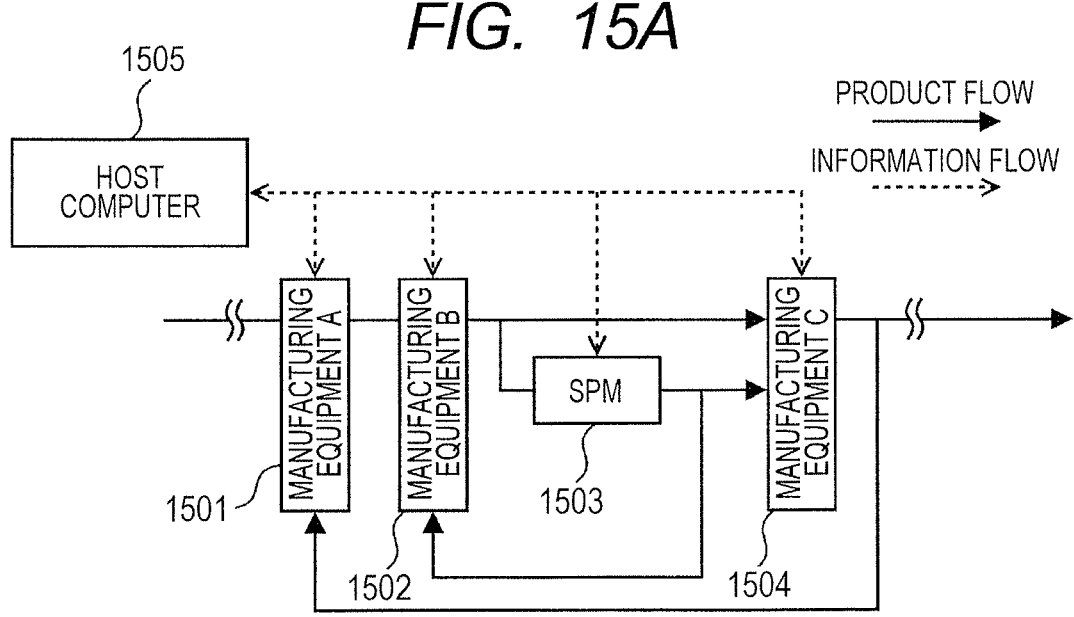
FIG. 15A is a block diagram showing a part of a semiconductor manufacturing process using the scanning probe microscope (SPM).

Operations of the SPM according to the present invention will be described referring to FIGS. 1, 15A and 15B. FIG. 15A represents a part of the semiconductor manufacturing process using the SPM according to the present invention for explanation of functions of the in-line SPM. The following explanation will be made on the assumption of the semiconductor manufacturing process. However, the description may be made by taking the manufacturing process of the hard disk as an example instead of the semiconductor. In this case, the wafer may be replaced with the recording medium, the wafer, the rover obtained by cutting the wafer into rectangles, and the head obtained by cutting the rover into pieces each for a unit of the head of the hard disk.

The wafer that has been processed by manufacturing devices A1501 and B1502 sequentially is separated into those subjected to the process of a manufacturing device C1504 per unit of lot, and those subjected to the manufacturing device C1504 after it is measured by an SPM 1503. Ratio between the separated wafers is preliminarily instructed to the host computer by an operator in consideration of the throughput (the number of the processed wafers per unit of time) of the SPM 1503, All the manufacturing devices 1501, 1502, 1504, and the SPM 1503 are connected to a host computer 1505 of the semiconductor manufacturing line via a data network. The host computer 1505 manages records and process steps of all the wafers in production. The wafers are carried among those devices by a carrier device (not shown). For example, the manufacturing device A1501 is a dry etching device, the manufacturing device B1502 is a resist peeling device, and the manufacturing device C1504 is a film formation device.

The wafers having the process by the manufacturing device B1502 completed is carried to the SPM 1503 at a predetermined rate based on the process management information of the wafer managed by the host computer 1505. The SPM 1503 sends the inquiry with respect to the process management information about the carried wafer to the host computer 1505 to obtain the coordinate information of the measurement point on the wafer for performing the measurement. The SPM 1503 outputs the measurement results of the respective measurement points on the wafer to the host computer 1505 after the measurement so that the wafer is carried to the manufacturing device C1504 by the carrier device.

The host computer 1505 analyzes the measurement results obtained from the SPM 1503, and changes (optimizes) the processing conditions of the respective manufacturing devices 1501, 1502 and 1504 as necessary. For example, the SPM 1503 measures the difference in the height of the etching at a plurality of positions on the wafer, and changes the etching condition of the manufacturing device A1501 (dry etching device) based on variation in the measurement values. Alternatively, there may be the case where after analysis of the SPM 1503 with respect to the measurement results, the wafer is returned to the manufacturing device B1502 so as to be processed again. The processing conditions in the cases as described above, which are different from those normally employed for the respective manufacturing devices are determined and managed appropriately by the host computer 1505 based on the measurement results of the SPM 1503. In a certain case, the operator may involve the aforementioned feedback operation (depending on the situation, feedforward may be performed for determining the processing conditions of the manufacturing process from the process performed by the SPM 1503 onward based on the SPM measurement results).

When determining (optimizing) the process conditions of the respective manufacturing devices based on the measurement results of the SPM 1503 in the process as described above, as the measurement accuracy of the SPM 1503 becomes higher, the process conditions of the respective manufacturing devices may be set in more detail. It is ideal to allow the SPM 1503 to complete measurement of the wafer with the process performed by the manufacturing device upstream of the SPM 1503 completed until it is processed by the next processing device without going through the SPM 1503 for the purpose of using the SPM 1503 as the in-line device in the semiconductor manufacturing process. Accordingly, it is an essential task to improve the throughput of the in-line SPM.

Figure 15B:
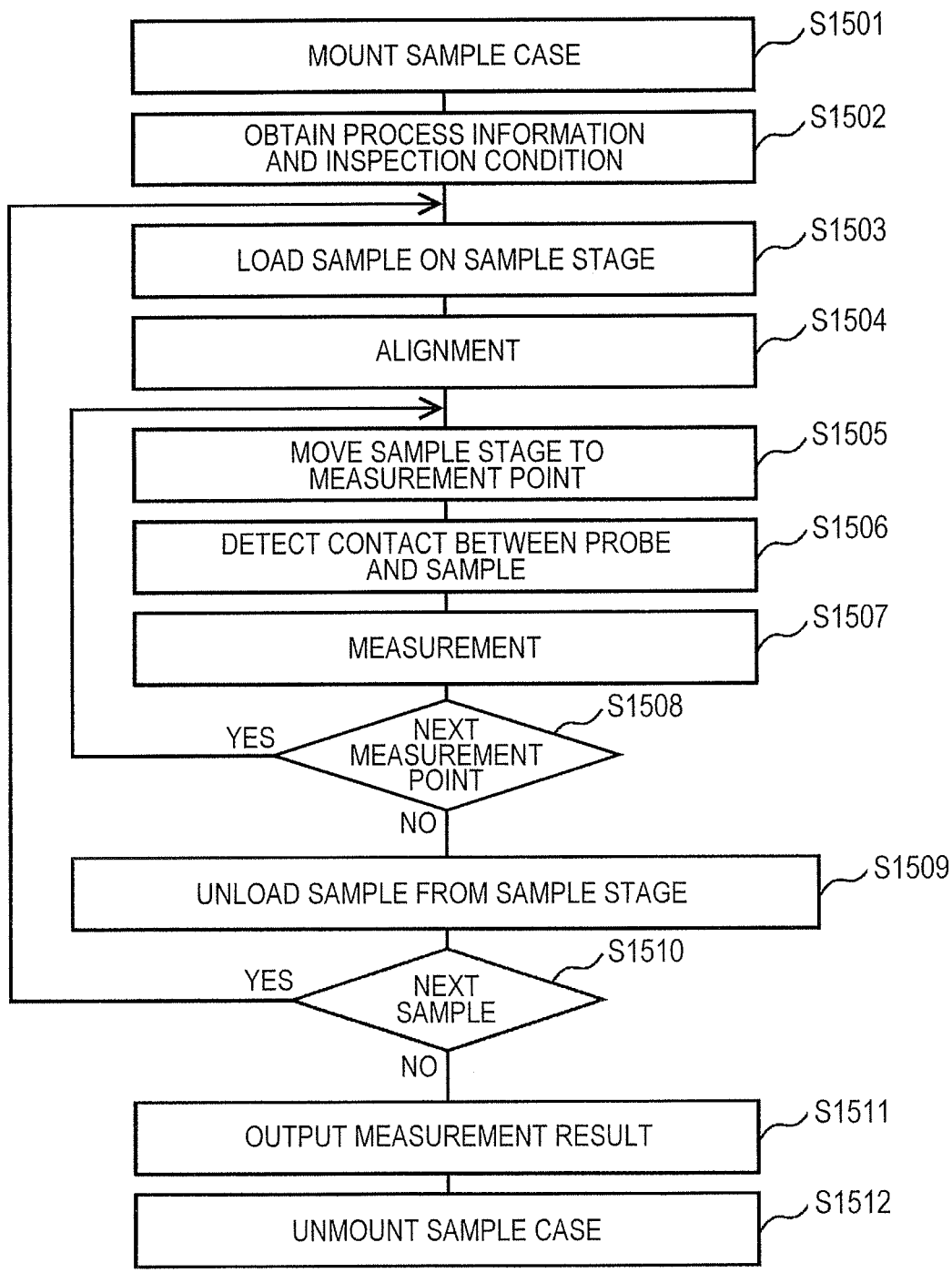
FIG. 15B is a flowchart showing a process flow executed when measuring a sample using the scanning probe microscope (SPM) in the semiconductor manufacturing process.

FIG. 15B is an explanatory view of a series of operations of the SPM 1503 according to the present invention. The specific operations of the SPM 1503 will be described referring to FIG. 1. The wafers with the process performed by the manufacturing devices 1501 and 1502 in the process upstream of the SPM 1503 completed are stored in a wafer case per unit of lot, and loaded in a wafer cassette of the SPM 1503 by the carrier device (S1501). The SPM 1503 reads the barcode of the wafer case, and obtains the corresponding process information and the inspection condition from the host computer of the semiconductor manufacturing line (S1502). Thereafter, a loader of the SPM 1503 picks up the single wafer from the wafer cassette, and mounts it on the sample stage 104 so that the orientation flat of the wafer is aligned in the fixed direction (S1503).

The wafer alignment is performed in the following process steps (S1504). First, the wafer 103 is held by the sample stage 104 with vacuum suction, and a wafer number drawn on the surface of the wafer 103 is read by a detector (not shown). Then it is moved to the position just below the probe drive mechanism 101 while being kept on the sample stage 104. The sample stage 104 in the Z-axis direction is positioned at the bottom dead center. Until this time, the observation optical system 105 moves upward to the top dead center to rotate a revolver (not shown) so that the objective lens 106 is replaced with, for example, an alignment objective lens (not shown) with low magnification of approximately 50. The parfocal distance for the objective lens 106 is the same as that of the alignment objective lens. Then the observation optical system 105 is moved downward to adjust the focus position so that the focal position is set to the back surface (upper surface) of the probe 102. The focusing operation is automatically performed by image recognition performed by the optical image processing unit 108. Then the observation optical system 105 is further moved downward by a fixed amount (for example, 1 mm) so as to move the focal position of the observation optical system 105 to the position lower than the one at which the SPM image is taken.

The sample stage 104 is moved in the XY-direction to the position where an alignment mark position on the wafer 103 comes within the field of view of the alignment objective lens (not shown). Then it is gradually moved upward in the Z-direction so as to bring the surface of the wafer 103 in line with the focal position of the observation optical system 105. The alignment mark is then recognized as the image by the optical image processing unit 108. At this time, under the condition where the aperture ratio of the alignment objective lens is low, the probe 102 may be observed simultaneously with the optical image obtained by the observation optical system 105. It is therefore preferable to perform the image recognition of the alignment mark at the position where the alignment mark is not overlapped with the probe 102 in the field of view of the observation optical system 105. The alignment mark on the wafer 103 is recognized as the image at least at two positions so that the correlation between the pattern on the wafer 103 and the XY-coordinate axes of the sample stage 104 is obtained, and stored in an overall control unit 114.

During the alignment operation of the wafer 103, the observation optical system 105 is moved downward by the fixed amount so that the focal position is moved to the position lower than the one for picking up of the SPM image. Accordingly, the surface of the wafer 103 is not brought into contact with the tip of the probe 102. After completion of the alignment operation, the observation optical system 105 is moved upward again to the top dead center to rotate the revolver (not shown) so that the lens is replaced with the objective lens 106 with high power (for example, 100 magnifications). The observation optical system 105 is moved downward, and the focus position is adjusted so that the focal position is brought in line with the rear surface (upper surface) of the probe 102. The focusing operation is automatically performed by the image recognition performed by the optical image processing unit 108. The observation optical system 105 is further moved downward by the fixed amount (for example, 1 mm) to move the focal position to the position lower than the one for picking up of the SPM image. In this case, the objective lens is replaced upon alignment of the wafer 103. However, the observation optical system 105 may have the function of zooming the optical image for changing the observation magnification without replacing the objective lens.

The overall control unit moves the sample stage 104 in the XY-direction to the position where the first measurement point comes into the field of view of the observation optical system 105 based on the inspection information (coordinate information) obtained from the host computer (S1505). The optical image processing unit recognizes the measurement point (or peripheral pattern of the measurement point) contained in the field of view (display region on the TV monitor 107) of the observation optical system 105 as the image. The XY-axis of the sample stage 104 is adjusted minutely to perform positioning of the measurement point. The objective lens 106 has the power of 100 magnifications, and moves the observation optical system 105 downward by the fixed amount (for example, 1 mm). The focal position is moved to the position lower than the one for picking up of the SPM image to observe the surface of the wafer 103. This makes it possible to observe the surface of the wafer 103 with high resolution without being influenced by the existence of the probe 102 provided in the field of view of the objective lens 106. For example, if the aperture ratio of the objective lens 106 is specified as 0.7, the pattern on the wafer 103 may be clearly observed under the condition of the resolution of 1 micrometer or less. It is possible to observe the pattern on the wafer 103 just below the probe 102. This is established by using the optical phenomenon obtained under the condition where the objective lens has a large aperture ratio, and the probe 102 occupies only a part of the field of view of the objective lens 106.

The positioning of the measurement points may be performed by the operator who observes the TV monitor 107 so as to directly designate the coordinate from the overall control unit. Thereafter, the observation optical system 105 is moved upward by the fixed amount to adjust the focus position so that the focal position is located on the rear surface (upper surface) of the probe 102.

The SPM according to the present embodiment is not required to move the sample stage 104 for the period from determination of the measurement point in the field of view of the observation optical system 105 to the end of the subsequent measurement operation. A conventional SPM is provided with the probe drive mechanism just above the probe, and accordingly, the field of view position of the observation optical system is overlapped with the SPM image measurement position. It is therefore necessary to secure the time for operating the stage so as to move the measurement point to the SPM image measurement position, and perform accurate positioning again. However, if it is provided with the function for observing the measurement point and the probe without moving the sample stage 104, the probe drive mechanism of the conventional SPM is installed just above the probe and it may prevent increase in the aperture ratio of the observation optical system, thus failing to allow observation of the pattern on the wafer surface with sufficient resolution. The SPM according to the present embodiment is configured to have the through hole 211 in the probe drive mechanism 101, which allows observation of the measurement point and the probe using the objective lens with high aperture ratio just above the probe 102 without moving the sample stage 104.

The operation for contacting the tip of the probe 102 with the surface of the wafer 103 (S1506) will be described. The probe drive mechanism 101 is a three-dimensional (X, Y, Z) probe scanning mechanism as a structure for driving the stage with the elastic deformation portion using the piezoelectric device, and provided with the probe 102 held at the probe holder 115 on the bottom. The probe drive mechanism 101 has the through hole that allows insertion of the objective lens 106 in the contactless manner. A focus axis (not shown) of the observation optical system 105 is adjusted to allow observation of both the probe 102 and the surface of the wafer 103 without moving the sample stage 104. The movable region of the probe drive mechanism 101 is set to 20 micrometers in the X-axis direction, 20 micrometers in the Y-axis direction, and 10 micrometers in the Z-axis direction. The detailed structure is illustrated in FIGS. 2A to 2C.

Figure 16A:
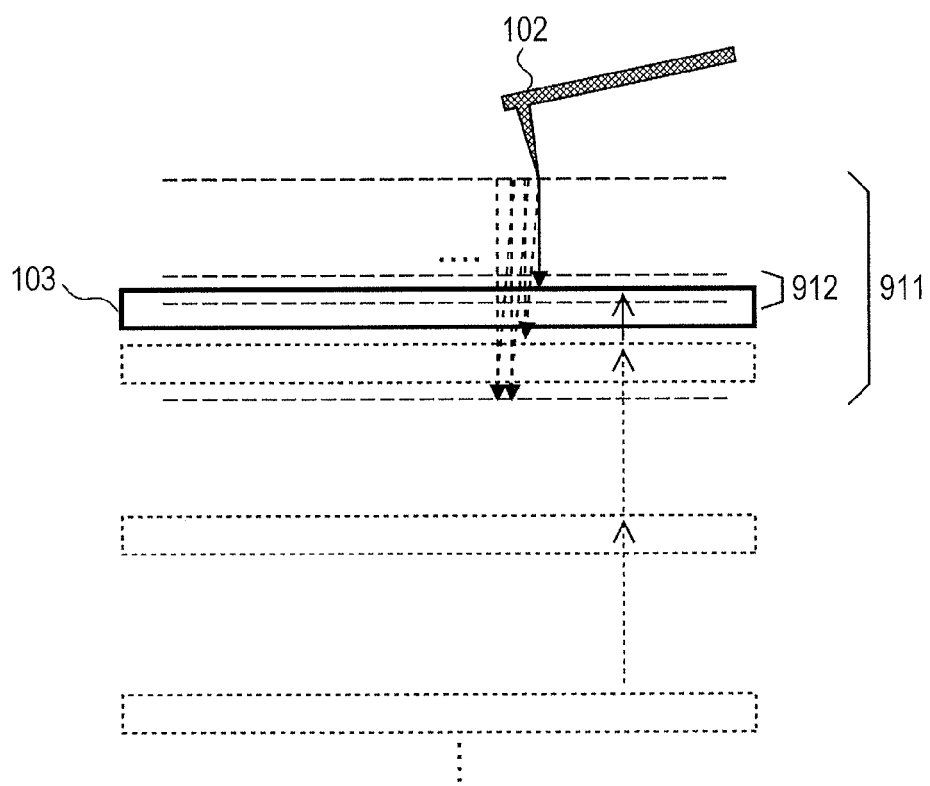
FIG. 16A is a front view of the probe in use for measurement of the sample surface.

The contact between the tip of the probe 102 and the surface of the wafer 103 will be described referring to FIGS. 16A and 16B. It is established by repeating a series of operations of (1) moving the probe drive mechanism 101 upward along the Z-axis to the top dead center, (2) moving the sample stage 104 upward along the Z-axis by 10 micrometers, and (3) moving the probe drive mechanism 101 downward along the Z-axis to the bottom dead center while monitoring the detection signal of the probe deflection detection unit 109. That is, if the tip of the probe 102 is brought into contact with the surface of the wafer 103 in the aforementioned step (3), the detection signal of the probe deflection detection unit 109 is changed. The probe scanning control unit 112 detects the aforementioned contact by capturing the change. The detailed operation principle has been described referring to FIG. 3.

Figure 16B:
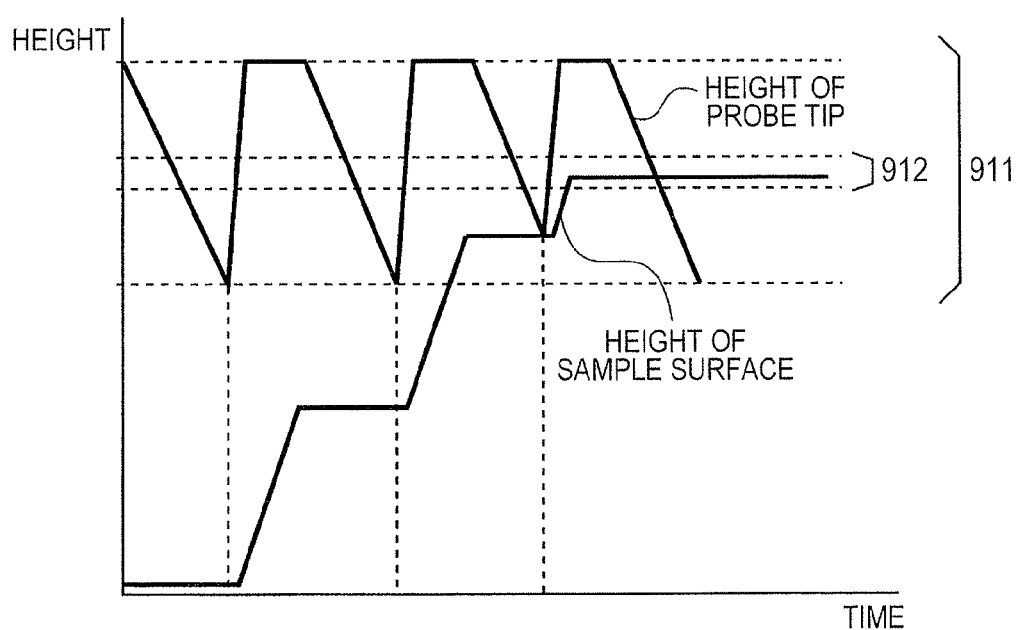
FIG. 16B is a graph showing changes with time in heights of the sample surface and the probe tip during measurement of the sample surface using the probe.

FIG. 16B indicates that the probe 102 is brought into contact with the sample 103 in the third cycle of step (3) for moving the probe downward. Thereafter, the probe 102 is moved upward to the top dead center, and the sample stage 104 is moved upward along the Z-axis by the amount calculated so that the height of the sample surface comes into a target height 912 set around the center of the movable range 911 in the Z-direction of the probe 102. The probe 102 is then moved downward again until the contact between the probe tip and the surface of the wafer 103 is detected (S1507). With the aforementioned method, only the probe 102 that can be controlled more accurately is driven in contacting the probe tip with the sample. This may provide the effect of preventing the damage to the fine probe tip, which may be caused by application of excessive force to the probe owing to the contact between the probe 102 and the sample 103 while driving the Z-axis at the sample side.

Figure 17A:
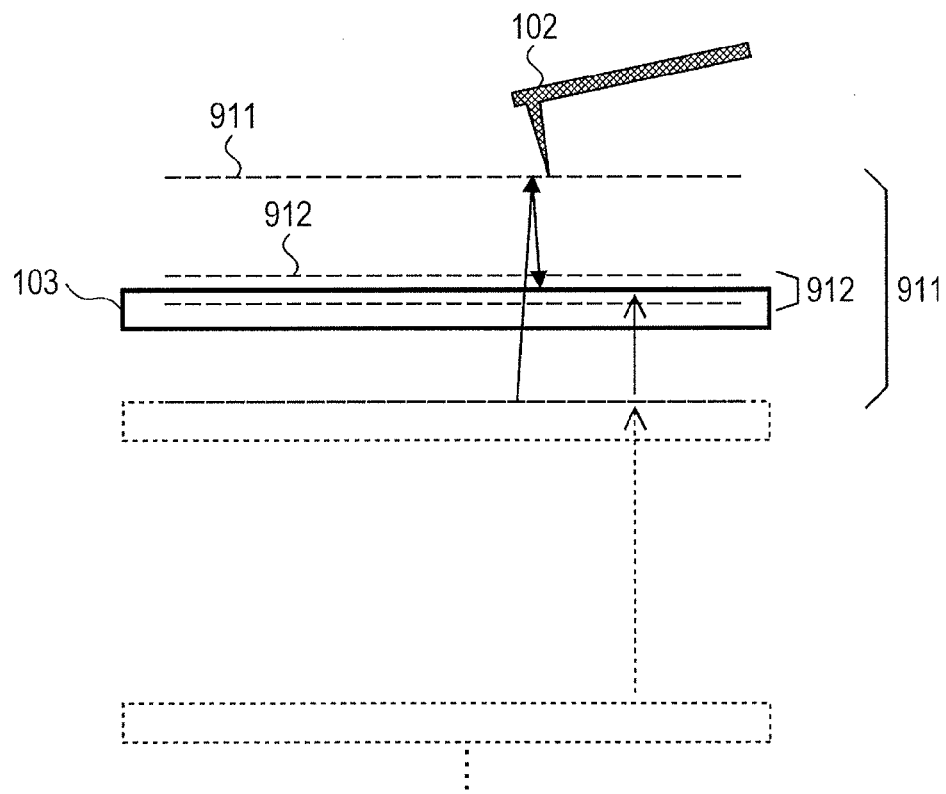
FIG. 17A is a front view of the probe in use during measurement of the sample surface as another example.
Figure 17B:
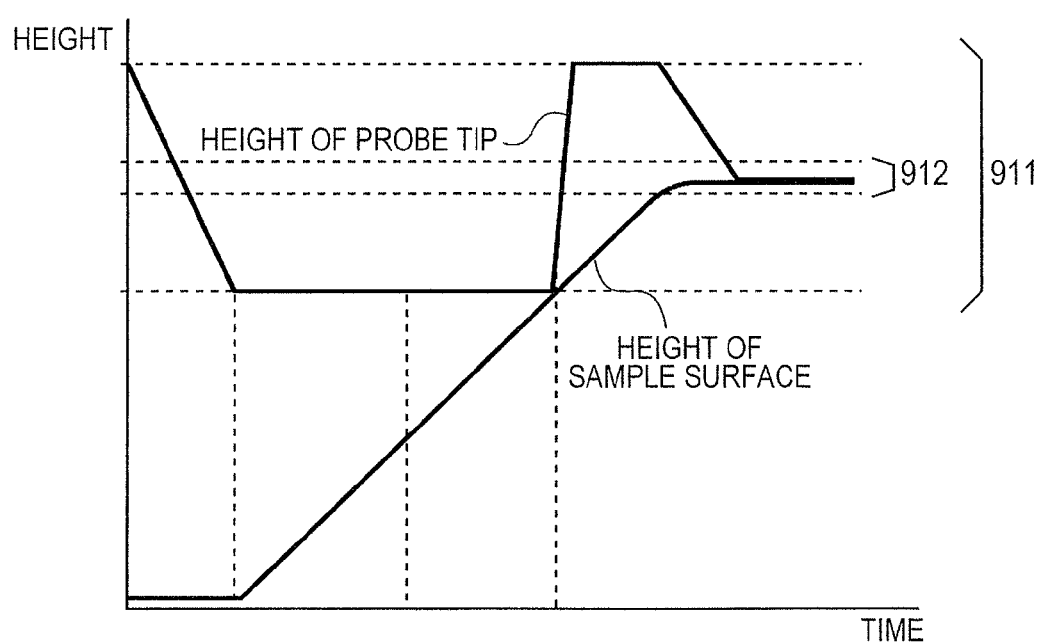
FIG. 17B is a graph showing changes with time in heights of the sample surface and the probe tip during measurement of the sample surface using the probe as another example.

Another method of making the probe 102 and the sample 103 proximal with each other will be described referring to FIGS. 17A and 17B. In this case, the sample 103 is moved upward by a sample Z-stage while having the probe 102 moved downward to the bottom dead center. Upon detection of the contact between the sample 103 and the probe 102, the probe 102 is immediately evacuated to the top dead center at high speeds so as to prevent the damage to the tip of the probe 102 while restraining the state where the driven and oscillated surface of the sample 103 is in contact with the probe 102 as least as possible. The surface of the sample 103 is moved upward by the amount calculated so that the height of the sample surface comes into the target height 912 set around the center of the movable range 911 of the probe 102, and then stopped. Thereafter, the probe 102 is moved downward again until the contact between the tip of the probe and the surface of the wafer 103 is detected.

After detecting the contact between the tip of the probe 102 and the surface of the wafer 103, the probe drive mechanism 101 is driven to scan with the probe 102 for picking up of the SPM image. For example, the region with 1 micrometer square on the wafer 103 is divided into 256 sections in the X-direction, and into 10 sections in the Y-direction, and the probe 102 is moved upward by 1 micrometer, for example. The contact position is sequentially moved toward the X-direction (Y-direction) so that the contact between the probe 102 and the wafer 103 is repeatedly detected. The contact detection is performed by operating only the probe 102 within the movable range of the probe drive mechanism 101 without moving the sample stage 104.

The operation of the probe drive mechanism 101 is controlled by the probe scanning control unit 112 via the probe drive control unit 110. Each of the movement axes (X-, Y-, Z-stages) of the probe drive mechanism 101 is provided with the capacitive sensor as shown in FIGS. 11A and 11B. The displacement of the respective capacitive sensors is detected by the stage displacement detection unit 128, and stored in an SPM image generation unit 113 via the probe scanning control unit 112. The SPM image generation unit 113 generates an XY-plane distribution image with respect to the displacement of the probe 102 measured in the state where the probe 102 is in contact with the respective contact points on the wafer 103 (displacement of the probe drive mechanism 101 on the Z-stage). The piezoelectric device used in the probe drive mechanism 101 is capable of operating at the response speed from 2 to 3 kHz. The aforementioned measurement operation ends within several seconds. The obtained SPM images (data) are stored in the overall control unit.

The measurement coordinate and the number of measurement points on the wafer 103 are preliminarily set. If there are measurement points left on the wafer 103, the observation optical system 105 and the sample stage 104 are moved downward by the equal amount so that the XY-coordinate of the stage 104 is moved to the coordinate of the next measurement point. The process then proceeds to the measurement operation again (S1508). If the measurement points no longer exist on the wafer 103, the observation optical system 105 and the sample stage 104 are moved downward by the equal amount to unload the wafer 103 from the sample stage 104 (S1509). If the next wafer to be measured exists in the wafer case, it is loaded on the sample stage 104 and performs the measurement repeatedly (S1510). When measurement of all the wafers in the wafer case is finished, the data stored in the overall control unit 114 are output to the host computer (S1511). The wafer case is carried to the next processing device by the carrier device (not shown) (S1512).

The conventional SPM is required to recognize the measurement position by the observation optical system for performing the measurement positioning, and to move the sample stage to the probe scanning mechanism (position of the probe 102). If the distance between the position of the observation optical system and the probe scanning mechanism (position of the probe 102) is 150 mm, 2 to 3 seconds may be required for operating the sample stage. However, when 10 measurement points exist on the single wafer, the total time taken for operation of the sample stage for the measurement positioning may be 20 to 30 seconds which may result in the cause of large deterioration in the measurement throughput of the SPM. The SPM according to the present embodiment is operated to allow observation of both the probe 102 and the surface of the wafer 103 by adjusting the focus of the observation optical system 105 without moving the sample stage 104, thus saving the time taken for performing the measurement positioning. As a result, the time taken for a series of operating the device for each of the wafers to be measured (loading the wafer, for example, measuring the etching unevenness at 9 measurement positions, and thereafter, unloading the wafer) may be 2 minutes or shorter (30 WPH). This makes it possible to implement the in-line SPM with improved throughput.

Figure 18A:
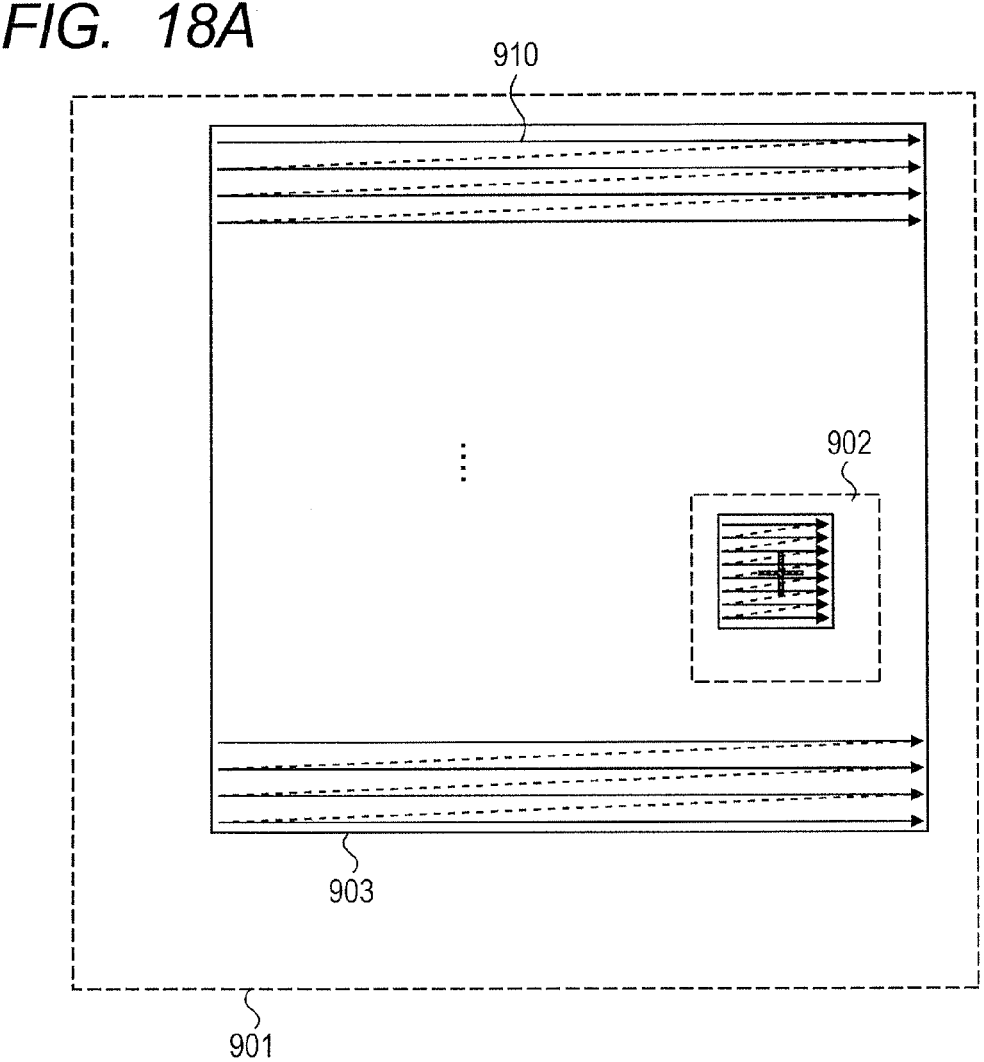
FIG. 18A is a plan view of the sample having a measurement region detected by largely scanning with the probe through the rough movement.
Figure 18B:
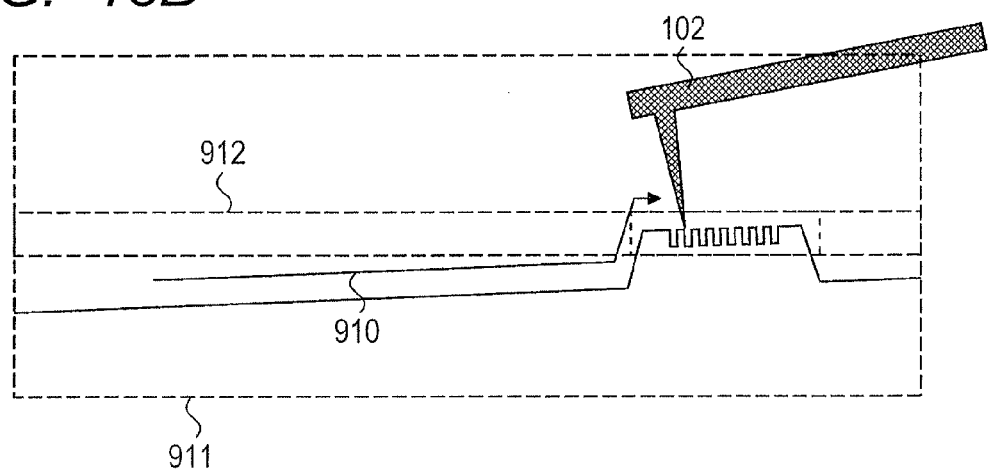
FIG. 18B is a front view of the probe in use during measurement in the measurement region.

The operation of the present invention will be described referring to FIGS. 18A and 18B, which is intended to designate the measurement position accurately based on the SPM measurement results rather than designation based on the coordinate of the sample XY-stage 410 and the observation results of the observation optical system 105. A reference numeral 901 denotes a region that can be scanned by the probe 102 through the rough movement piezoelectric device. A range 910 that is considered to contain the pattern required to be measured is scanned with the probe 102 to obtain the measurement results 910. The pattern required to be measured is found from the results, and the area that contains only the pattern is accurately measured by the probe 102. At this time, if the area is smaller than a measurable size (area that can be scanned by the fine movement element) 902 of the fine movement piezoelectric device, the rough movement piezoelectric device is fixed so as to allow the high-accuracy measurement by the scanning only with the fine movement piezoelectric device. If the two types of actuators for the rough movement and the fine movement along the Z axis are installed, the position of the rough movement piezoelectric device is adjusted so that the height of the area required to be measured comes into the height control width 912 of the fine movement piezoelectric device. This makes it possible to perform high-accuracy measurement with respect to the height.

Figure 19:
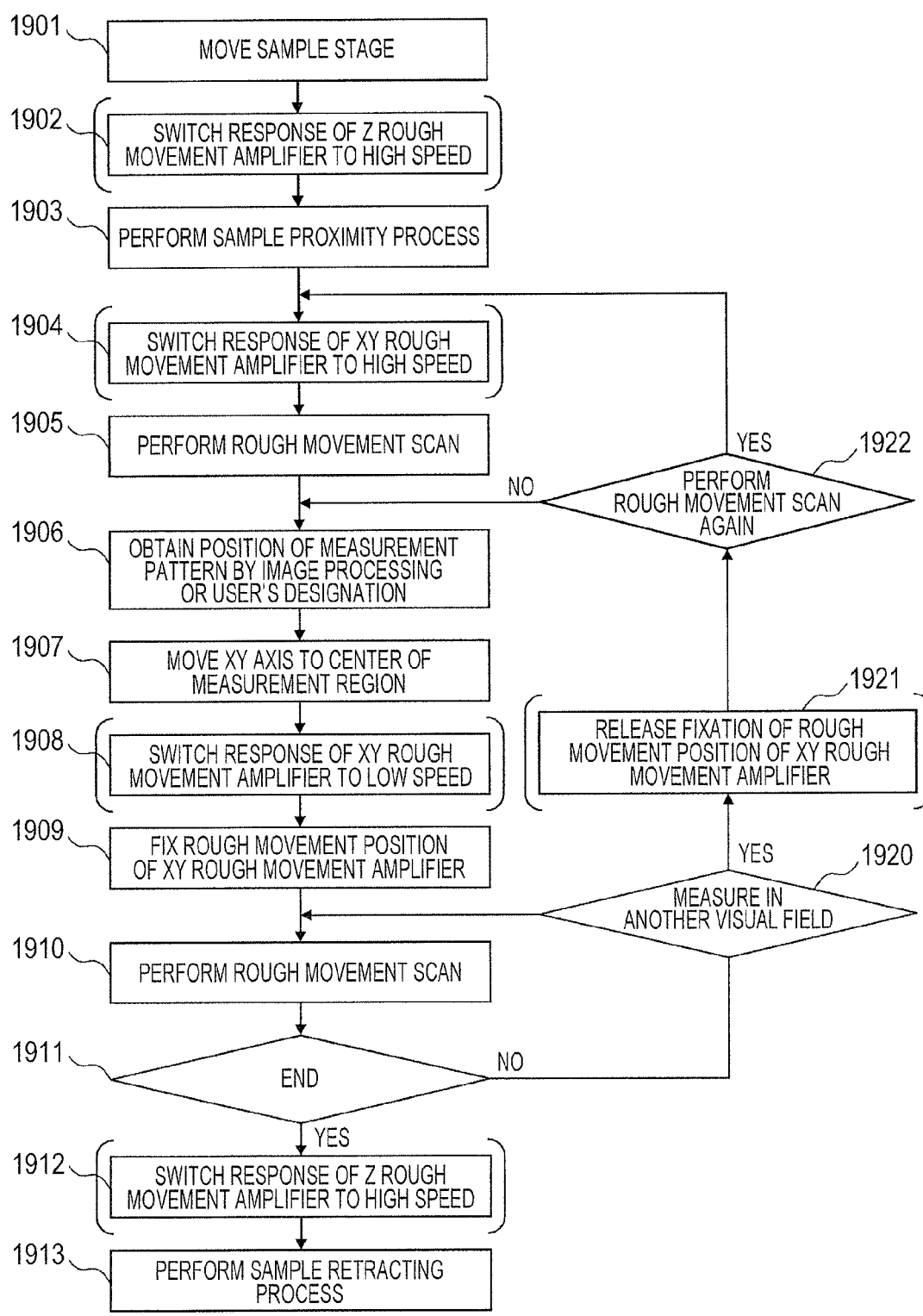
FIG. 19 is a flowchart of the process corresponding to operations shown in FIGS. 18A and 18B.

The measurement sequence will be described referring to FIG. 19. Firstly, the sample stage is moved to bring the probe 102 to the position above the sample 103 required to be measured (S1901). If the response of the Z rough movement amplifier is required to be explicitly switched, it is switched at high speeds (S1902). The sample proximal process as described referring to FIGS. 16 and 17 is executed (S1903). If the response of the XY rough movement amplifier is required to be explicitly switched, it is switched at high speeds (S1904). The rough movement scanning with the probe 102 is performed for measurement (S1905) (The aforementioned control is executed by the probe scanning control unit 112 shown in FIG. 15). Based on this, the position of the measured pattern is automatically obtained through image processing by the overall control unit 114 from those obtained measurement images (in the SPM image generation unit 113), or designated on the screen by the user (S1906).

If the response of the XY rough movement amplifier is required to be explicitly switched after moving the XY-axis to the center of the measured region (S1907), it is switched at low speeds (S1908). Alternatively, rough movement fixation is performed (S1909). If the rough and fine movement mechanisms along the Z axis are installed, the similar process will be performed. Thereafter, the scanning with the probe 102 through the fine movement piezoelectric device is performed to implement the high-accuracy measurement with higher power (S1910). IN case the measurement is finished (S1911), the response of the Z rough movement amplifier is switched at high speeds in response to the need of explicit switching of the Z rough amplifier (S1912), and the sample 103 is evacuated (S1913). In case the zooming or minor measurement of the measurement position is required again in the field of view of the same fine movement scanning, the fine movement scanning is performed again.

If the measurement is required to be performed in another field of view (S1920), the process is started again from obtaining the position through the image processing or designation by the user. If there is no pattern required to be measured in the range of the same rough movement scanning, the response of the XY rough movement amplifier is explicitly switched again at high speeds if needed (S1921). The process is started over from the operation for changing the rough movement scanning range for scanning again (S1922).

The aforementioned sequence allows high speed and high-accuracy measurement by switching between the high speed scanning in the broad range and the high-accuracy scanning in the narrow range according to the present invention.

An embodiment of another laser interference displacement gauge different from the capacitive sensor will be described as the displacement gauge used for the present invention referring to FIGS. 20, and 21A to 21C. The capacitive sensor detects the interval from the flat metal electrode as the target as a value converted into the change in the electrostatic capacity. Meanwhile, the laser interference displacement gauge detects the interval from the flat mirror as a value converted into the phase of the interference pattern.

Figure 20:
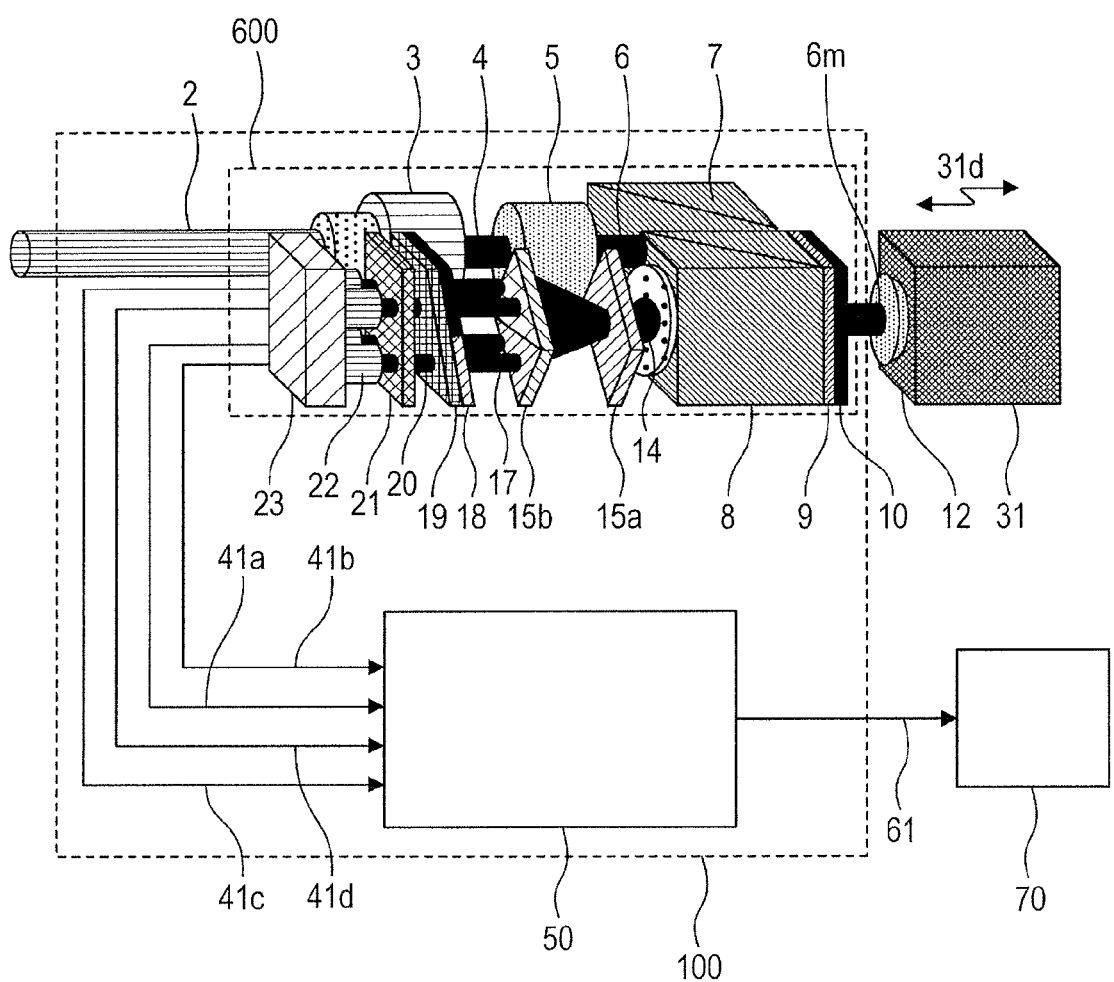
FIG. 20 is a perspective view of an optical interference displacement sensor.

As FIG. 20 shows, an optical interference displacement sensor of the embodiment includes a light source unit (not shown), a sensor unit 100 and a displacement output unit 70. The light source unit guides a linear polarized laser beam with the wavelength of 632.8 nm which is emitted from a frequency stabilizing He—Ne laser light source to the sensor unit 100 in a polarizing direction at 45° with a polarization-preserving fiber 2.

The sensor unit 100 includes an interferometer 600 and a displacement computing unit 50. The interferometer 600 allows the collimator 3 to form the polarized light at 45° projected from the polarization-preserving fiber 2 into a parallel light 4, and further allows transmission of a polarizer 5 such as Glan-Thompson prism so as to reflect the transmitted light 6 at a prism mirror 7 and an unpolarized beam splitter 8. It is further allowed to have incidence to a reference mirror 9.

Figure 21A:
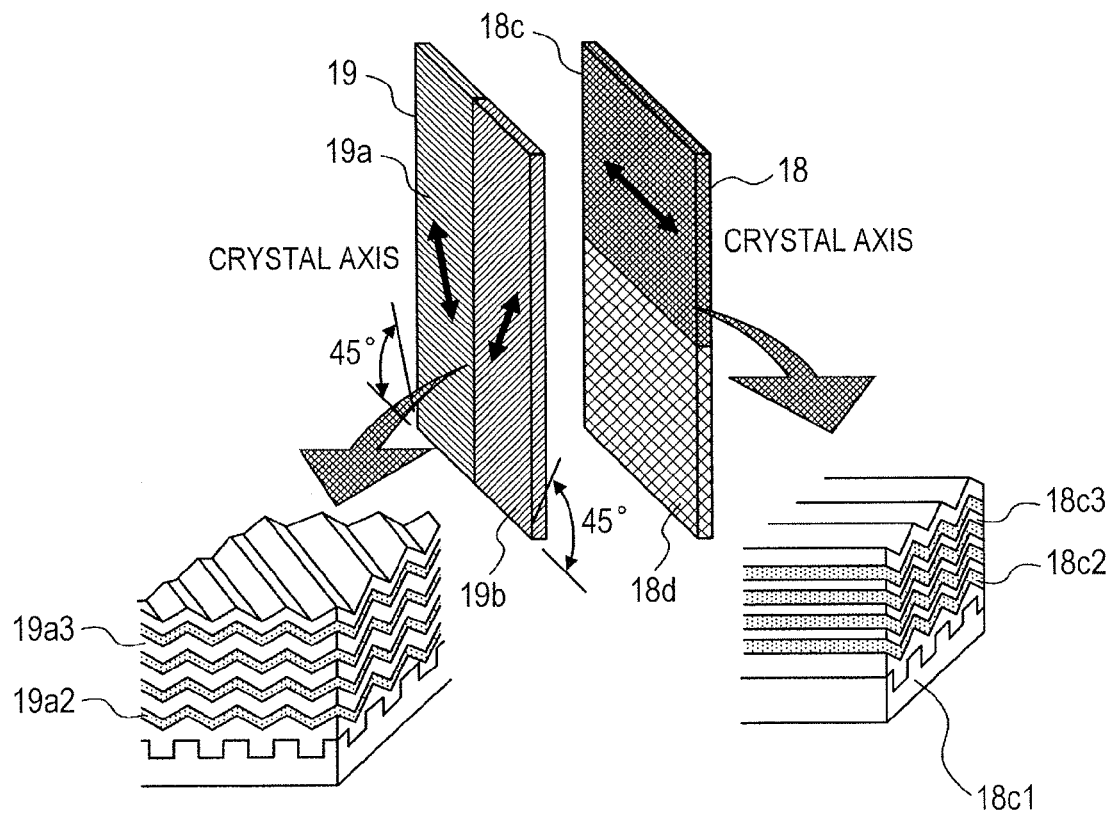
FIG. 21A shows a perspective view and a partially enlarged view each showing a structure of a phase shift element used for the optical interference displacement sensor.
Figure 21B:
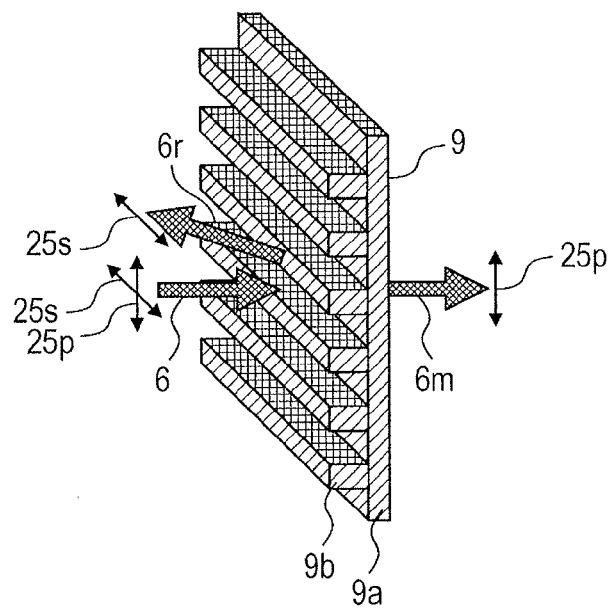
FIG. 21B is a perspective view of a diffraction polarization grating used as a reference mirror of the optical interference displacement sensor.

As shown in FIG. 21B, the reference mirror 9 is structured by forming a diffraction grating 9b made of metal such as aluminum on a synthetic quarts substrate 9a. The incident polarized beam 6 directed at 45° to the diffraction grating is formed of two orthogonal polarization components resulting from vector resolution. An S polarization component 25s parallel to the longitudinal direction of the diffraction grating reflects thereon, and an orthogonal P polarization component 25p transmits the diffraction grating. That is, this diffraction grating shows the nature of so-called diffraction polarizer (Wire Grid Polarizer). In this embodiment, the pitch, stroke width, and height of the diffraction grating 9b are set to 144 nm, 65 nm, and 165 nm, respectively.

An S polarized beam 6r reflected from the reference mirror 9 is used as the reference beam. A transmitted P polarized beam 6m is used as the measurement light. The P polarized beam 6m transmits a quarterwave plate 10, and then becomes a circular polarized light. It is reflected from a target mirror 12 mounted on a measuring object 31 to transmit the quarterwave plate 10 again, and becomes the S polarized light. It is reflected on the reference mirror 9, transmits the quarterwave plate 10, and becomes a circular polarized light. It is reflected on the target mirror 12 to transmit the quarterwave plate 10, and becomes a P polarized light. It then transmits the reference mirror 9. In other words, the measurement light 6m reciprocates on the optical path between the reference mirror 9 and the target mirror 12 twice. A moving distance 31d of the measuring object 31 is detected as the value magnified twice. The S polarized beam 6r reflected from the reference mirror 9, and the transmitted P polarized beam 6m are synthesized as an orthogonal polarized beam 14 which transmits the unpolarized beam splitter 8.

The orthogonal polarized beam 14 passes through an opening 13 for removing the stray light, and is divided into four orthogonal polarized beams 17 using two oppositely arranged quadrangular pyramidal prisms 15a and 15b. The method of dividing the beam is not limited to the use of the prism as described above. The diffraction optical device may also be applied. The four orthogonal polarized beams 17 transmit phase shift elements 18 and 19, which cause polarization interference between the orthogonal polarized components in the state where the phase shifts of 0, $\pi/2$, $\pi$, $3\pi/2$ are given so as to generate four phase shift interference lights 20.

The phase shift element 18 is divided into two sections as shown in FIG. 21A. The lower half section is formed of a synthetic silica 18d, and the upper half section is formed of a photonic crystal 18c. Referring to an enlarged view, the photonic crystal 18c forms horizontal line-and-space-like diffraction grating at the pitch smaller than the wavelength of the incident light to a synthetic silica substrate 18c1, on which dielectric thin films 18c2 and 18c3 each having a different refractive index are stacked. The cross section of the thin film layers stacked on the diffraction grating retains the jagged shape like a triangular waveform in the film thickness direction by means of the concavo-convex structure of the diffraction grating. As the material for forming the thin film, Si, $SiO_2$, $TiO_2$, $Ta_2O_5$, $Nb_2O_5$ may be employed. The multilayer thin film structure based on the diffraction grating becomes the photonic crystal having the diffraction grating directed toward the crystal axis. It presents the double refraction characteristic resulting from diffraction and interference among a plurality of thin films. This makes it possible to control characteristics of polarization, transmission and reflection of the incident light (Reference: Product catalog of Photonic Lattice, Inc.)

The diffraction grating pitch, depth and thickness of each of the thin films are controlled in consideration of the wavelength of the incident light and the desired characteristic. As an important characteristic, use of the film forming technique such as the photolithography technique and spattering employed for the semiconductor device manufacturing allows polarized elements and wavelength elements each having the crystal axis directed differently to be formed in array on a single substrate. The photonic crystal 18c has a function as the quarterwave plate, and the crystal axis direction is indicated by a bold arrow. As illustrated in FIG. 19, among four orthogonal polarized beams 17, two orthogonal polarized beams that transmit the photonic crystal 18c have the phase difference of $\pi/2$ therebetween. Meanwhile, the rest of two orthogonal polarized beams transmit the synthetic silica 18d without causing the phase difference.

Figure 21C:
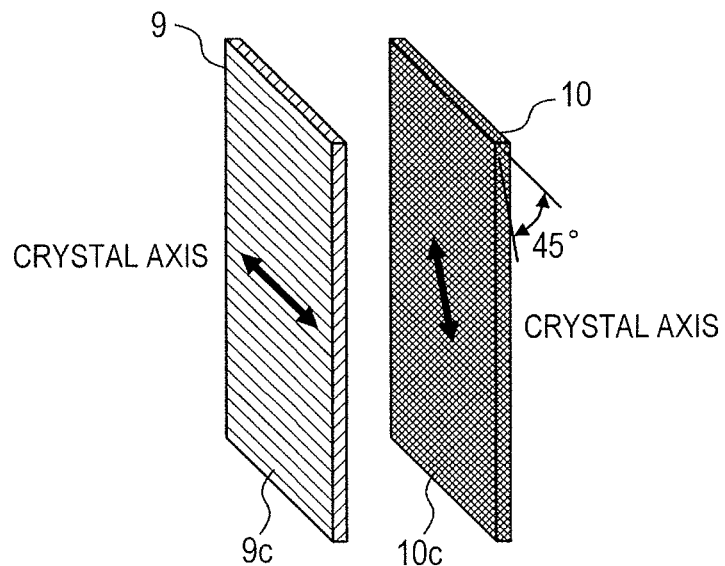
FIG. 21C shows a perspective view of a photonic crystal used as the reference mirror of the optical interference displacement sensor, and a perspective view of the photonic crystal used as a quarterwave plate.

The phase shift element 19 is divided into two sections as shown in FIG. 21C. The left half section is formed of a photonic crystal 19a with a crystal axis directed at 45°, and the right half section is formed of a photonic crystal 19b with a crystal axis inversely directed at 45°. Likewise the photonic crystal 18c, the photonic crystal 19a has the line-and-space-like diffraction grating directed at 45° at a pitch smaller than the wavelength of the incident beam on a synthetic silica substrate 19a1, on which dielectric thin films 19a2 and 19a3 each having the different refractive index are stacked. The photonic crystal 19b has the same structure. The photonic crystals 19a and 19b serve as polarizers, and the respective crystal-axis directions are indicated by bold arrows. Referring to FIG. 20, among four orthogonal polarized beams 17, two polarized components that constitute the two orthogonal polarized beams which transmit the photonic crystal 19a, and two polarized components that constitute the two orthogonal polarized beams which transmit the photonic crystal 19b interfere with one another in the state where the phase difference of $\pi$ is relatively given.

The polarized interference occurs among the respective orthogonal polarized components of the four orthogonal polarized beams 17 that have transmitted the phase shift elements 18 and 19 in the presence of the phase shifts of 0, $\pi/2$, $\pi$, $3\pi/2$ so that four phase shift interference lights 20 are generated. The four phase shift interference lights 20 transmit an interference filter 21 with the transmission center wavelength of 632.8 nm, and are received by four photoelectric transducers 22 such as photodiodes for the purpose of avoiding the influence of the ambient light. They are amplified by an amplifier 23 so as to be output as four phase shift interference signals 41a, 41b, 41c, and 41d.

The four phase shift interference signals 41a, 41b, 41c, and 41d are expressed as the following formulae (1) to (4), respectively.

$$Ia = Im + Ir + 2(Im \cdot Ir)(1/2)\cos(4\pi nD/\lambda) \quad \text{(formula 1)}$$

$$Ib = Im + Ir + 2(Im \cdot Ir)(1/2)\cos(4\pi nD/\lambda + \pi) \quad \text{(formula 2)}$$
$$= Im + Ir - 2(Im \cdot Ir)(1/2)\cos(4\pi nD/\lambda)$$

$$Ic = Im + Ir + 2(Im \cdot Ir)(1/2)\cos(4\pi nD/\lambda + \pi/2) \quad \text{(formula 3)}$$
$$= Im + Ir + 2(Im \cdot Ir)(1/2)\sin(4\pi nD/\lambda)$$

$$Id = Im + Ir + 2(Im \cdot Ir)(1/2)\cos(4\pi nD/\lambda + 3\pi/2) \quad \text{(formula 4)}$$
$$= Im + Ir - 2(Im \cdot Ir)(1/2)\sin(4\pi nD/\lambda)$$

where Im denotes a detection intensity of the probe light, Ir denotes a detection intensity of the reference light, n denotes the diffraction index of air, D denotes a moving distance 31d of the measuring object 31, and λ, denotes the wavelength of the laser light 4.

The displacement computing unit 50 calculates the moving distance D of the measuring object 31 based on the formula (5), which is displayed on a displacement output unit 70 as a moving distance signal 61.

$$D = (\lambda/4\pi n)\tan^{-1}\{(Ic-Id)/(Ia-Ib)\} \quad \text{(formula 5)}$$

In the embodiment, the diffraction polarized element (Wire Grid Polarizer) is employed as the reference mirror 9. As has been clearly described above, it is possible to employ the photonic crystal 9c having the horizontal crystal axis direction as indicated by FIG. 21C. The quarterwave plate 10 is allowed to employ a photonic crystal 10c having the crystal axis directed at 45°. In order to further simplify the interferometer 600, the phase shift element 19 shown in FIG. 21C is formed only of the photonic crystal 19a. The phase shift interference signals 41a and 41c expressed by the formulae (1) and (3) are calculated, based on which the moving distance D of the measuring object 31 may be obtained.

As FIG. 20 clearly shows, two beams directed to the target mirror 12, that is, the measurement light 6m and the reference light 6r are emitted from the light source unit to the sensor unit 100. They pass a completely identical optical path until they reach the reference mirror 9, and further from the reference mirror 9 to the four photoelectric transducers 22. In other words, the common path interferometer is structured. If air fluctuation causes the temperature distribution or refractive index distribution in the optical path, or mechanical oscillation occurs, such disturbance may equally influence both beams. Therefore, as both beams interfere with each other, the influence caused by the disturbance is completely offset. As a result, the interference light is not influenced by the disturbance. The measurement light 6m only exists on the optical path between the reference mirror 9 and the target mirror 12. As the stroke of the scanning probe microscope is several hundreds of microns at most, the interval between the reference mirror 9 and the target mirror 12 may be set to 1 mm or smaller. The influence of the disturbance in such a small interval is negligible. Fluctuation in the intensity of the laser beam by itself is expressed as fluctuation of the probe light detection intensity Im and the reference light detection intensity Ir, respectively in the formulae (1) to (4). They may be offset by subtraction and division in the formula (5) executed by the displacement computing unit 50.

The optical interference displacement sensor of the present embodiment is simply configured to generate four orthogonal polarized beams, and allow the arrayed phase shift elements to generate four phase shift interference beams spatially in parallel so as to be received. Compared to the conventional phase shift interferometer, it largely reduces the optical components to provide a merit of significantly reducing the size of the displacement sensor. Specifically, the dimension of the interferometer 600 may be reduced approximately to 20×15× 50 mm or smaller. As four phase shift interference lights pass the adjacent optical paths, it is possible to minimize the influence of the disturbance caused by such as the temperature distribution, humidity distribution, atmospheric pressure distribution, and airflow change owing to the air fluctuation between the optical paths, even if those disturbance are superimposed.

The optical interference displacement sensor according to the present embodiment is capable of stably measuring the moving distance and a position of the measuring object with accuracy from sub-nanometers to 10 picometers or less without controlling the environmental factors such as the temperature, humidity, atmospheric pressure, density, and acoustic oscillation with high-accuracy. The SPM scanning mechanism is feedback controlled using such sensor to ensure stable control of the position of the probe tip of the SPM with the accuracy from sub-nanometers to 10 picometers or less, resulting in the high-accuracy SPM device.

INDUSTRIAL AVAILABILITY

The present invention is applied to the scanning probe microscope used for inspection measurement and failure analysis in the semiconductor manufacturing process, and measurement of the sample shape with high-accuracy, for example, three-dimensional shape of the magnetic medium with stripe-like or dot-like structure of the hard disk device.

REFERENCE SIGNS LIST

1 . . . light source unit 2 . . . polarization-preserving fiber
3 . . . collimator 5 . . . polarizer 7 . . . prism mirror
8 . . . unpolarized beam splitter 9 . . . reference mirror
10 . . . quarterwave plate
12,12x,12y,12z . . . target mirror
14,17,81,218 . . . orthogonal polarized beam
13 . . . opening 15a,15b . . . quadrangular pyramidal prism
18,19,82,83,84,219,220 . . . phase shift element
9c,10c,18c,19a,19b,82c,82d,83c,83d, 84a,84b . . . photonic crystal
20,85,221 . . . phase shift interference light
21,86 . . . interference filter 22 . . . photoelectric transducer
23,88,223 . . . amplifier 31 . . . measuring object
50,51,52 . . . displacement computing unit
70 . . . displacement output unit 101 . . . probe drive mechanism
102 . . . probe 103 . . . wafer 104 . . . sample stage
105 . . . observation optical system 106 objective lens
201,202 . . . holder 203 . . . Y-stage
204a,204b,204c,204d . . . elastic deformation portion
205,206,209,210,216,217 . . . piezoelectric device
205a,206a,209a,210a,216a,217a . . . rough movement piezoelectric device
205b,206b,209b,210b . . . displacement expansion mechanism 205c,206c,209c,210c,216c,217c . . . fine movement piezoelectric device
205a',210a . . . rough movement actuator 207 . . . X-stage
211 . . . through hole 214 . . . Z-stage 240 . . . fine movement stage
230a,230b,230c,230d . . . elastic deformation portion
231a,231b,231c,231d . . . elastic deformation guide
241 . . . rough movement stage 220,221 . . . target
222,223,224,301 . . . laser diode
311 . . . photodetector 401 . . . sample stage
410 . . . displacement sensor 402 . . . rough XY-stage
404 . . . air slider 403 . . . rough Z-stage 405 . . . surface plate
406 . . . elastic plate 410 . . . sample XY-stage
500 . . . flutter piezoelectric device driver
501 . . . driver amplifier 506 . . . switcher 506r . . . switcher r
510 . . . rough movement piezoelectric device driver
511 . . . driver amplifier 512 . . . output resistance

The invention claimed is:

1. A scanning probe microscope which measures a surface shape of a sample by bringing a probe into proximal to or contact with the surface of the sample, comprising:
 a probe;
 a probe holder that holds the probe;
 probe drive unit that drives the probe holder at least in a vertical direction;
 first measurement unit which measures a position of the probe drive unit in the vertical direction;
 sample stage unit movable in a plane, on which a sample is mounted;
 second measurement unit which measures a position of the sample stage unit in a direction orthogonal to the plane;
 vertical rough stage unit configured to change a vertical relative position between the probe held by the probe holder and the sample stage unit;
 horizontal rough stage unit configured to change a horizontal relative position between the probe held by the probe holder and the sample stage unit;
 detection unit which detects a contact state between the sample and the probe held by the probe holder; and
 image generation unit that generates an image of the sample surface using information obtained through measurement performed by the first measurement unit, information obtained through measurement performed by the second measurement unit, and information obtained through detection performed by the detection unit.

2. The scanning probe microscope according to claim 1, wherein the probe drive unit further includes an XY drive portion for driving the probe in an XY direction, and an XY direction position measurement portion for measuring a position of the probe driven by the XY drive portion in the XY direction.

3. The scanning probe microscope according to claim 1, wherein the second measurement unit includes a plurality of displacement gauges, each of which measures a displacement in a direction orthogonal to the plane in which the sample stage unit is movable, and a measurement data correction portion which obtains an inclination of the sample stage unit using outputs of the plurality of displacement gauges, and corrects measurement data of the displacement in the direction orthogonal to the plane in which the sample stage unit is movable based on information of the obtained inclination.

4. The scanning probe microscope according to claim 1, wherein the second measurement unit is configured to be positioned substantially below the probe irrespective of a movement of the horizontal rough stage unit.

5. The scanning probe microscope according to claim 1, wherein the probe drive unit includes a vertical drive portion that drives the probe holder in the vertical direction, and an in-plane drive portion that drives the probe holder in the plane orthogonal to the vertical direction, at least one of the vertical drive portion and the in-plane drive portion is provided with a rough movement actuator with a large drive range for driving the probe and a fine movement actuator with a small drive range.

6. A sample surface shape measuring method using a scanning probe microscope, comprising the steps of:
 driving a probe in a vertical direction with respect to a surface of a sample mounted on a sample stage that is movable in a plane using a probe drive system;
 bringing the probe into proximal to or contact with the surface of the sample by changing a relative position between the probe and the sample stage in the vertical direction using vertical rough stage unit;
 measuring a position of the probe drive system in the vertical direction;
 measuring a position of the sample stage in a direction orthogonal to the plane; and
 correcting a displacement component of the sample stage in the direction orthogonal to the plane upon movement of the sample stage therein using information derived from measurement of the position of the probe drive system in the vertical direction, and information derived from measurement of the position of the sample stage in the direction orthogonal to the plane for measurement of the surface shape of the sample.

7. The sample surface measuring method according to claim 6, wherein the displacement of the sample stage in the direction orthogonal to the plane in which the sample stage is movable is measured by a plurality of displacement gauges, an inclination of the sample stage is obtained using information of the displacement in the direction orthogonal to the plane in which the sample stage is movable, which has been measured by the plurality of displacement gauges, and measurement data of displacement in the direction orthogonal to the plane in which the sample stage is movable measured upon movement of the sample stage are corrected based on information of the obtained inclination.

* * * * *